United States Patent
Sato et al.

[11] Patent Number: 6,034,754
[45] Date of Patent: Mar. 7, 2000

[54] LIQUID CRYSTAL DISPLAY DEVICE WITH COMPENSATING FILM(S)

[75] Inventors: Yasushi Sato; Takehiro Toyooka, both of Yokohama; Hitoshi Mazaki, Kawasaki, all of Japan

[73] Assignee: Nippon Oil Company, Limited

[21] Appl. No.: 09/085,962

[22] Filed: May 27, 1998

[30] Foreign Application Priority Data

May 27, 1997 [JP] Japan .................................. 9-136654

[51] Int. Cl.⁷ .................................................. G02F 1/1335
[52] U.S. Cl. ........................ 349/102; 349/117; 349/119; 349/121
[58] Field of Search .................................. 349/102, 121, 349/117, 119

[56] References Cited

U.S. PATENT DOCUMENTS

| | | | |
|---|---|---|---|
| 5,184,236 | 2/1993 | Miyashita et al. | 349/119 |
| 5,212,819 | 5/1993 | Wada | 349/119 |
| 5,493,431 | 2/1996 | Baba et al. | 349/117 |
| 5,646,703 | 7/1997 | Kamada et al. | 349/118 |
| 5,667,854 | 9/1997 | Yamada | 428/1 |
| 5,736,067 | 4/1998 | Kawata et al. | 252/299.5 |
| 5,793,455 | 8/1998 | Nakamura | 349/96 |
| 5,855,971 | 1/1999 | Kobori et al. | 428/1 |

*Primary Examiner*—William L. Sikes
*Assistant Examiner*—Tarifur R. Chowdhury
*Attorney, Agent, or Firm*—Scully, Scott, Murphy & Presser

[57] ABSTRACT

Provided is a liquid crystal display device of a TN type which is improved on a display contrast, gray scale characteristics and viewing angle characteristics of a display color. A liquid crystal cell of a TN type for drive is sandwiched by a pair of upper and lower polarizing plates and at least one compensating film which has an extinction axis angle of 5 to 90 degrees as an absolute value and an optical rotating angle of 0.5 to 10 degrees as an absolute value, wherein signs of the extinction axis angle and the optical rotating angle are contrary to each other, is inserted between the liquid crystal cell and the upper polarizing plate, or between the liquid crystal cell and the lower polarizing plate, or at least two compensating films are respectively inserted between the liquid crystal cell and the upper polarizing plate, and between the liquid crystal cell and the lower polarizing plate, wherein a quasi fast axis vector of a compensating film and an easy axis vector of an electrode substrate nearer the compensating film of the liquid crystal cell satisfy an angular relation therebetween in the range of −30 to +30 degrees or +150 to +210 degrees.

3 Claims, 18 Drawing Sheets

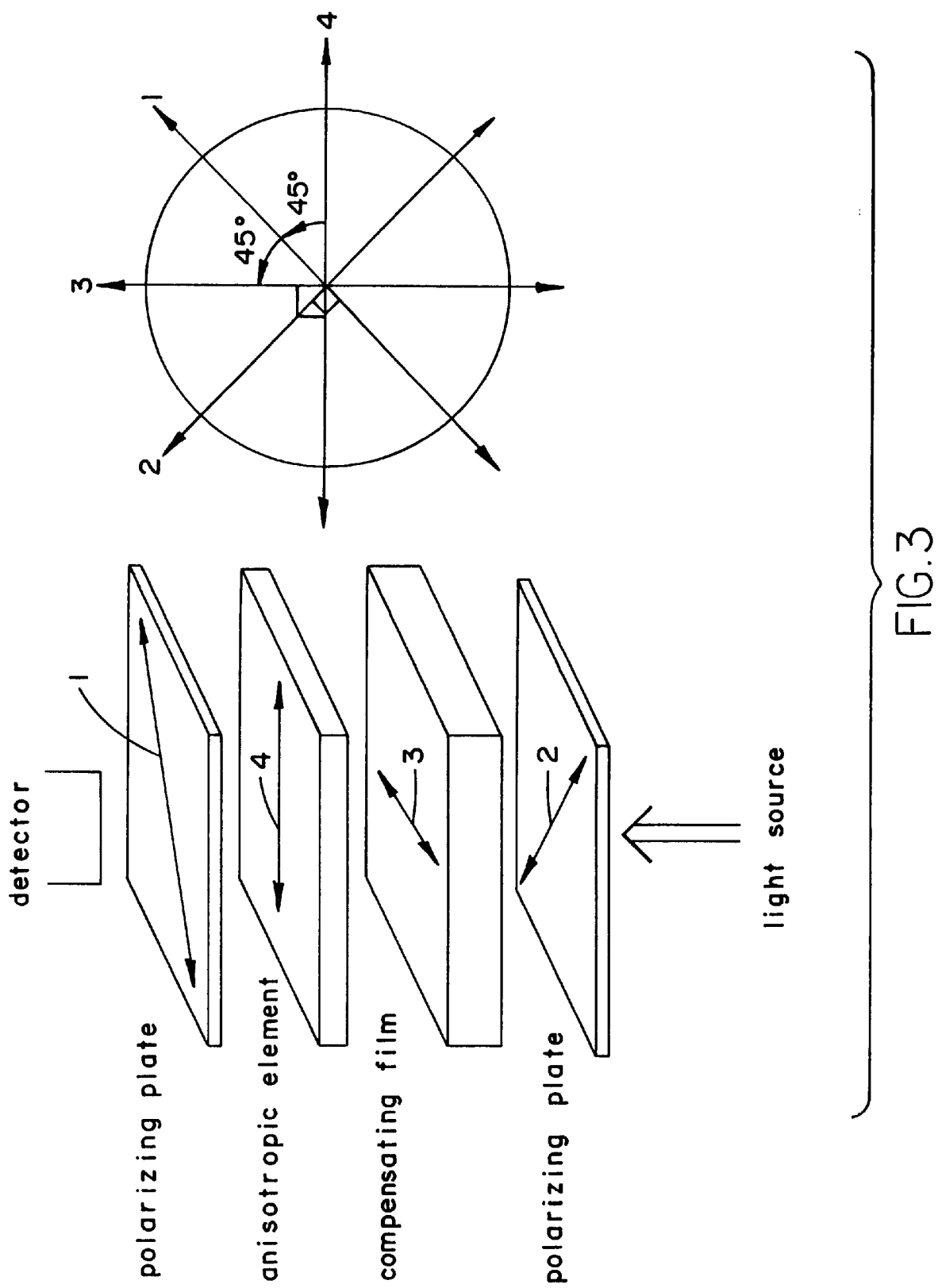

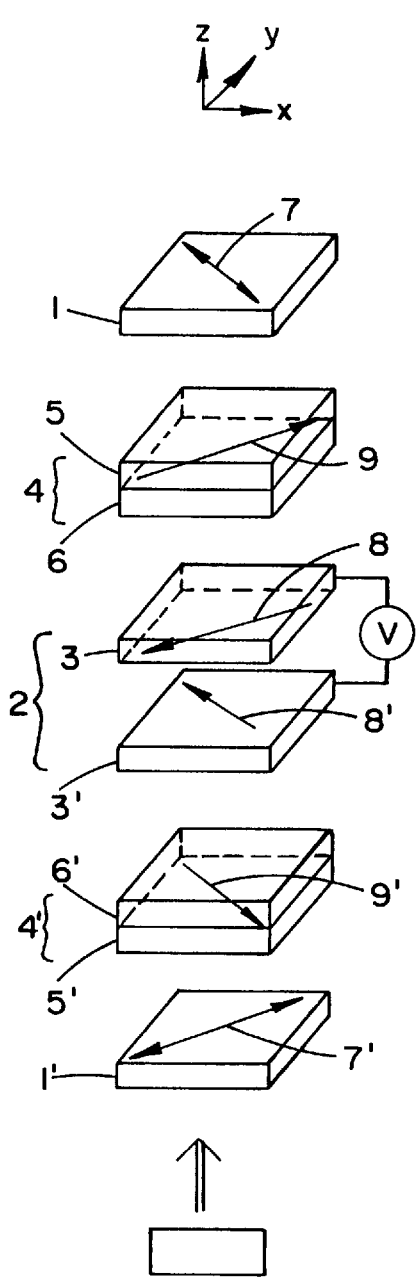
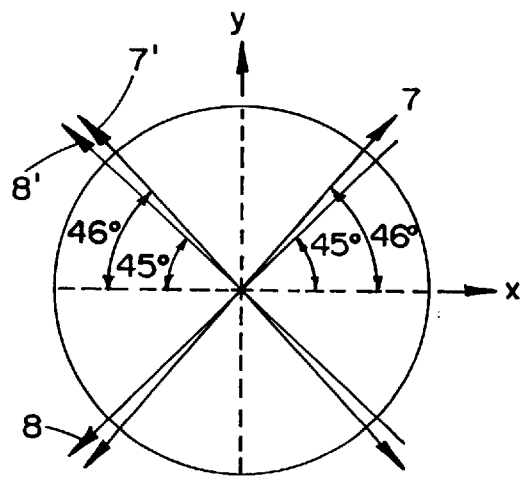
FIG.6(b)
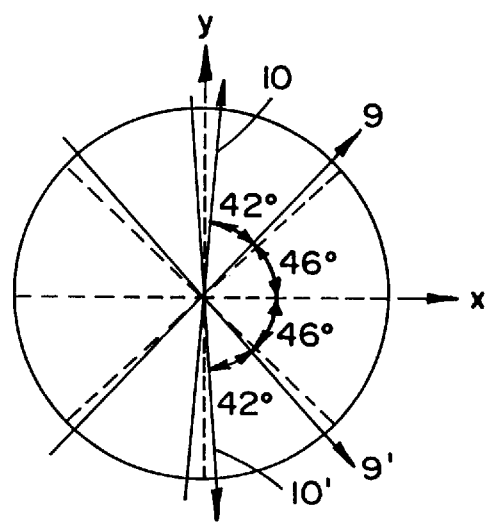
FIG.6(c)
FIG.6(a)
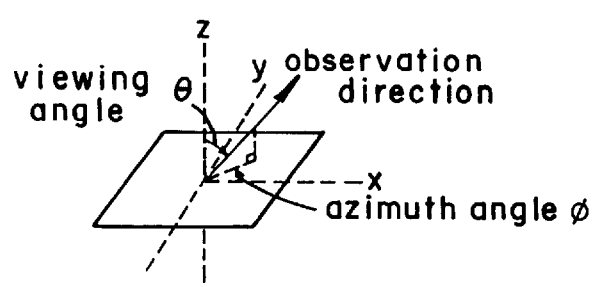
FIG.6(d)

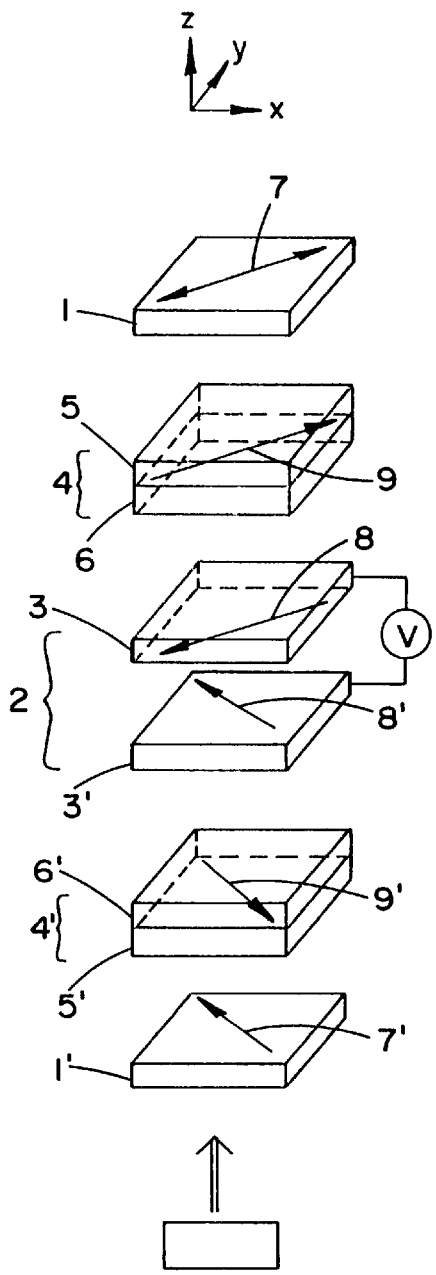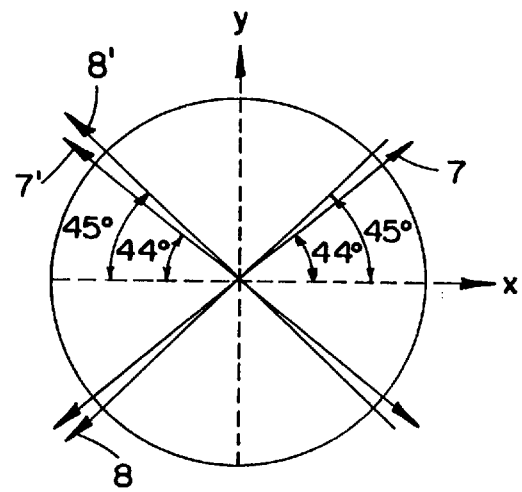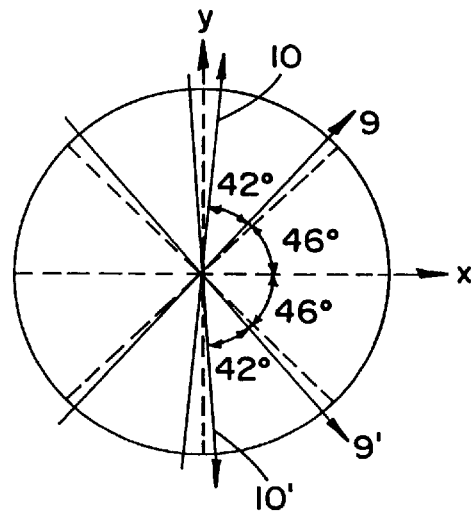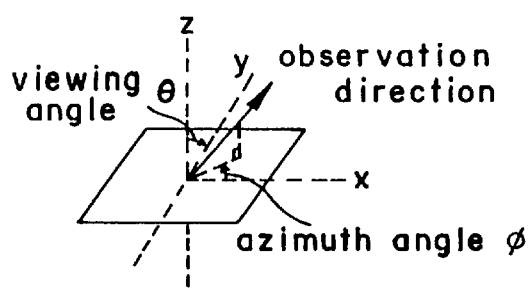
FIG. 8(a)
FIG. 8(b)
FIG. 8(c)
FIG. 8(d)

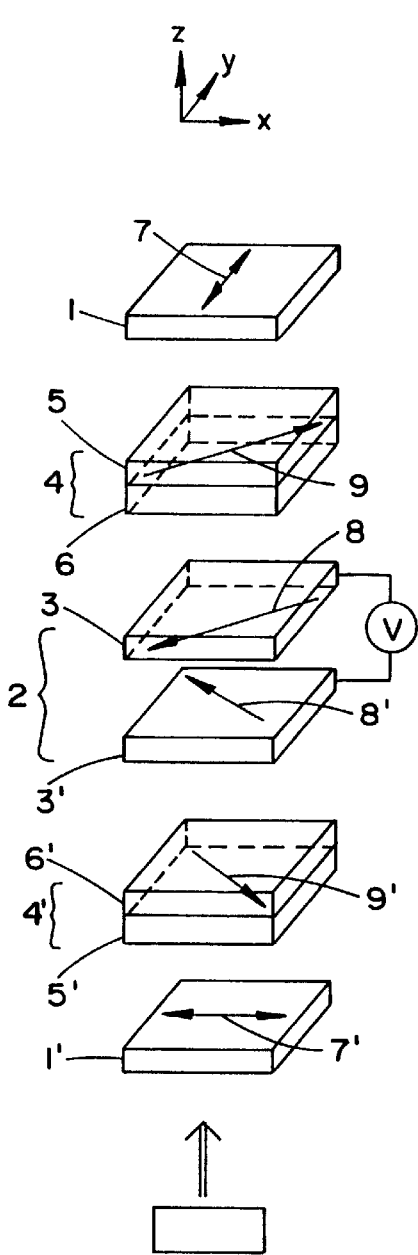
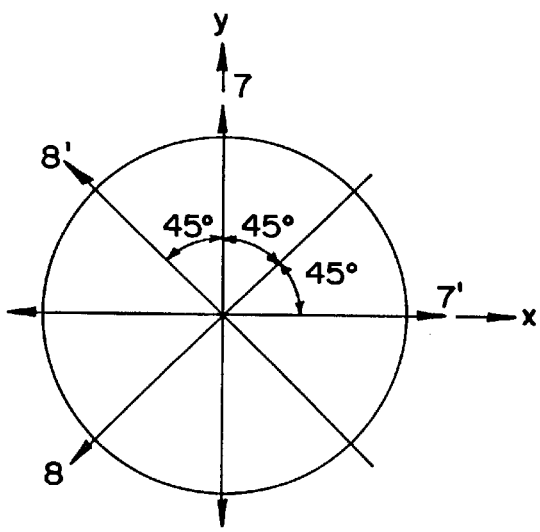
FIG.10(b)
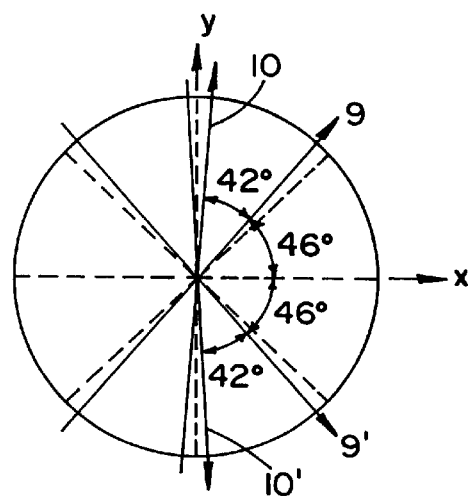
FIG.10(c)
FIG.10(a)
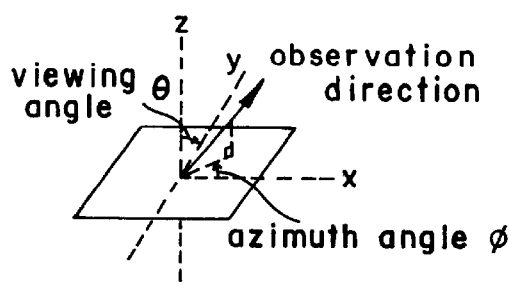
FIG.10(d)

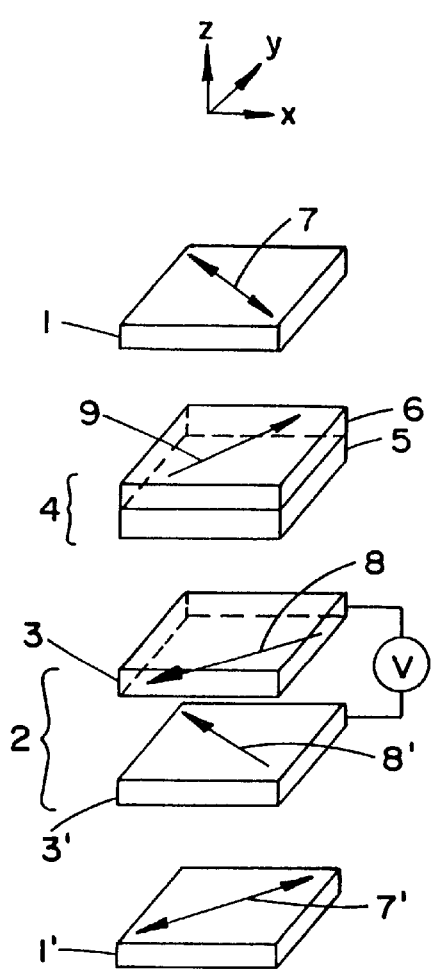
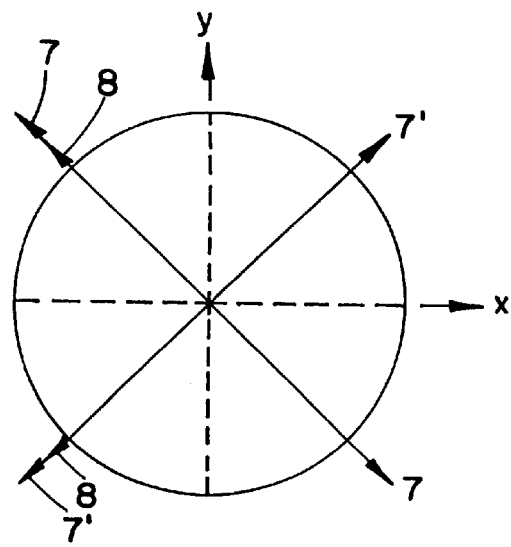
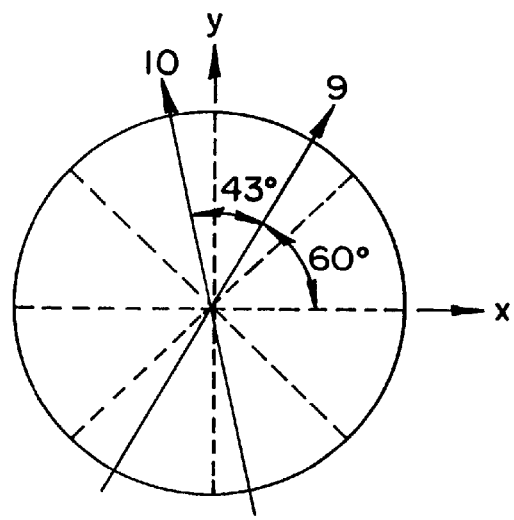
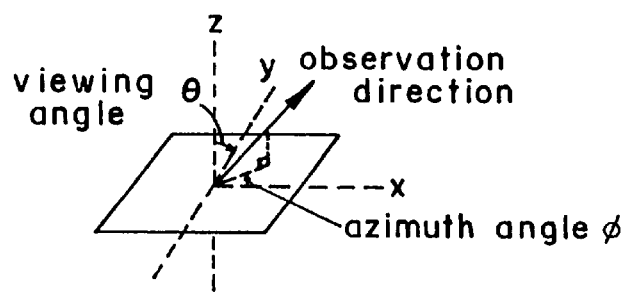
FIG.12(a)
FIG.12(b)
FIG.12(c)
FIG.12(d)

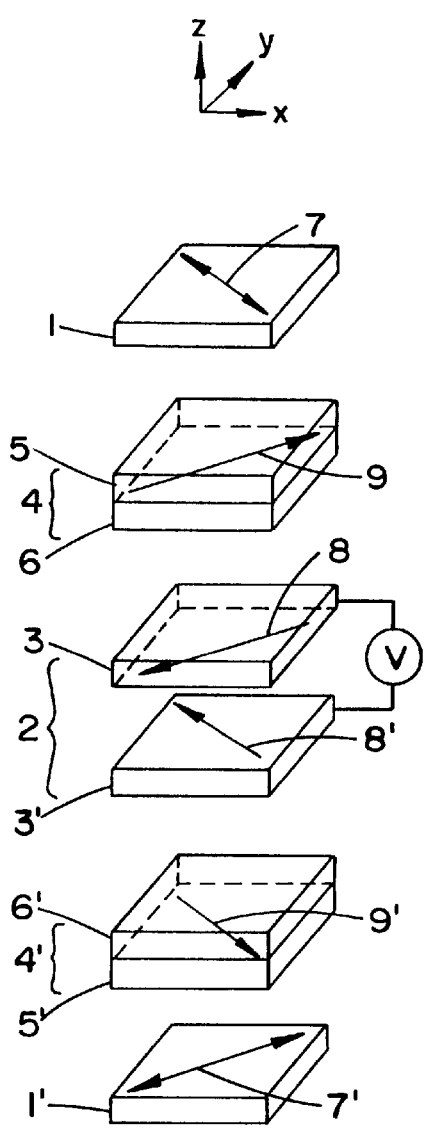
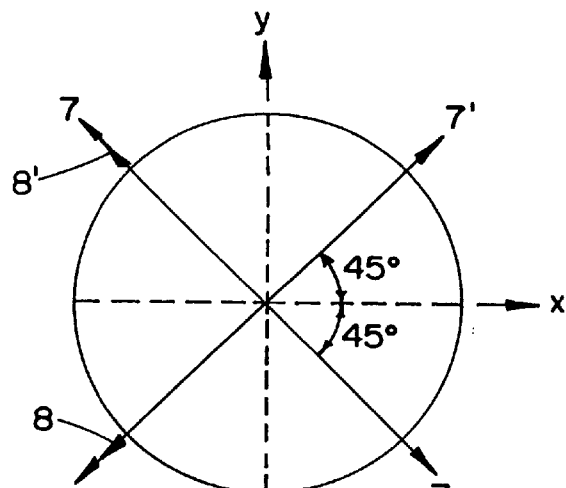
FIG.16(b)
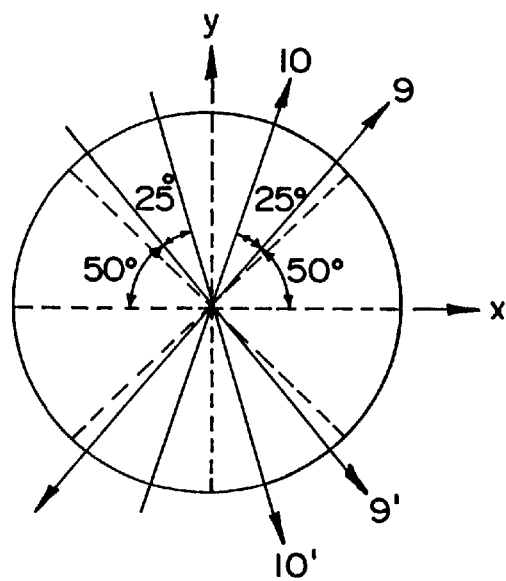
FIG.16(c)
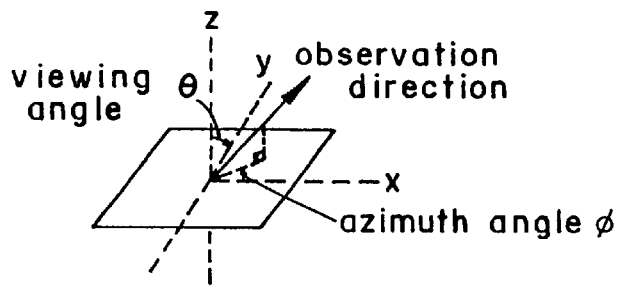
FIG.16(d)
FIG.16(a)

LIQUID CRYSTAL DISPLAY DEVICE WITH COMPENSATING FILM(S)

FIELD OF THE INVENTION

The present invention relates to a liquid crystal display device of a TN type which is improved on a display contrast, gradation characteristics and viewing angle characteristics of a display color.

BACKGROUND OF THE INVENTION

A liquid crystal display has widely spread as a display for a note type personal computer, a portable electronic gadget, a portable television receiver and the like because of its features of low voltage drive, light weight, low cost and the like. Among them, a TFT (thin film transistor)-LCD (liquid crystal display) using a liquid crystal of a TN (twisted nematic) type has widely been getting used as a high performance display which is a substitution of a cathode ray tube since the liquid crystal display has features of high precision, high image quality and high speed response. However, when the liquid crystal display is compared with a cathode ray tube, a fatal fault of a display using a TN type liquid crystal is that there is a viewing angle dependence of a display. The viewing angle dependence is a problem to decrease in a display performance (contrast and degradation) when a display is seen along an oblique direction. While this is caused by use of a liquid crystal with an optical anisotropy or a polarizing plate and an LCD generally has such a fault, a problem relating to a viewing angle dependence is severer in a TN-TFT-LCD than in other types of display method since the TN-TFT-LCD has a target specialized in high quality display. For example, in a liquid crystal television receiver which is one of important applications of TFT-LCD, a small change in color or lightness by a viewing angle is sensed by a user as uncomfortable. When a larger area is to be realized, there arises another problem that the same levels of display cannot be obtained at a center and in the periphery of a picture plane since a viewing angle is different at the positions on the picture plane.

In a LCD which is normally white, light is transmitted through in a condition of non-selection and a display is obtained by intercepting light which is caused under application of a selective voltage. A viewing angle dependence of a liquid crystal display is caused by an orientational order of a liquid crystal in a TN liquid crystal cell for drive and especially by an orientational state of a liquid crystal in a light intercepting condition in a greater degree. Therefore, in order to compensate a viewing angle, it is only required to pay attention to an orientational state of liquid crystal when a selective voltage is applied (in a black display) and all that is required for a compensating plate is that it has an effect to extinguish a refractive index anisotropy of an orientational state of a liquid crystal. Features of an orientational order of a liquid crystal cell for drive in a black display are the following two:

1) While liquid crystal molecules are oriented approximately along a perpendicular direction to an electrode substrate, the molecules assume a near-homogeneous orientational order in the vicinity of the substrate due to an anchoring effect. That is, a director of a liquid crystal is not uniform but an inclination to a cell substrate continuously changes along a thickness direction.

2) An influence of a twisted orientational order remains because of anchoring of a substrate. If an applied voltage in a black display is extremely higher, almost all the liquid crystal molecules can be orientated along a perpendicular direction to the substrate and a twist in a twisted orientational order can be extinguished. However, the twisted orientational order cannot perfectly be extinguished in a practical range of an applied voltage.

Conventionally, a compensating film to improve a viewing angle with an attention paid to an orientational state of a liquid crystal cell for drive has been disclosed in, for example, JP 8-50206 A, JP 8-334621 A, JP 9-61624 A, JP 9-26572 A and the like. These publications have paid attention to a fact that a liquid crystal molecule in the liquid crystal is in the shape of a column and a nature of being a negative uniaxial material has been utilized in common among them.

In the JP 8-50206 A and JP 8-34621 A, from the view point of 1) as above mentioned, a hybrid orientational order of a discotic liquid crystal is utilized as a compensating film and a compensating film whose orientational order is fixed has been proposed. However, an influence of a twist in 2) as mentioned above cannot be neglected and thereby the performance of the compensating film has also a limitation.

A teaching included in the JP 9-61624 A is to make a twist effect exercised in a false manner by stacking a plurality of films. However, while a liquid crystal in a liquid crystal cell for drive is continuously twisted and thereby a inclination of a director also changes in a continuous manner, a compensating film of a multi-layer type obtained by means of stacking necessarily has discontinuity in not only a twist but inclination of a director and thereby there is present a limitation on performance. Besides, there are many problems from a view point of production since a process for forming a multi-layer structure is complicated.

The JP 9-26572 A discloses a compensating film made of a discotic liquid crystal having a twisted orientation order. This film has a twisted orientational order in which a magnitude of a projected vector on a film plane of a director of a discotic liquid crystal changes along a thickness direction. In the case of this film, the features recited in 1) and 2) as mentioned above are basically satisfied and therefore a compensating effect which have not conventionally been available can be estimated to be exercised, as clearly seen form description of the publication.

When a viewing angle compensation is achieved by use of a compensating film as mentioned above, optimization of a liquid crystal cell and a compensating film is necessary in order to obtain a sufficient compensating effect. If the optimization is not effected, a compensating effect cannot sufficiently be exercised even if the compensating film is ideal so as to satisfy the features of the 1) and 2) as mentioned above. That is, when a liquid crystal cell for drive and a compensating film are used without optimization on a structure of an orientational order of a liquid crystal in each of the liquid crystal cell for drive and the compensating film, and a relative arrangement of the liquid crystal cell to the compensating film, there is a fear that a display performance of a LCD is further deteriorated.

As mentioned above, while progress in development of an LCD of a TN type which has a feature of a broad viewing angle has been conspicuous in these days, a liquid crystal display device having a sufficient performance has not been obtained yet.

OBJECT OF THE INVENTION

The present invention is made to solve the above mentioned problems and to provide a liquid crystal device having a wide viewing angle which has not conventionally been available by optimizing a liquid crystal of a TN type for drive and a optical film for compensation.

SUMMARY OF THE INVENTION

That is a first aspect of the present invention is concerned with a liquid crystal display comprising a liquid crystal cell of a TN type for drive sandwiched by a pair of upper and lower polarizing plates in which at least one compensating film which has a quasi extinction axis angle of 5 to 90 degrees as an absolute value and an optical rotating angle of 0.5 to 10 degrees as an absolute value, wherein signs of the quasi extinction axis angle and the optical rotating angle are contrary to each other, is inserted between the liquid crystal cell and the upper polarizing plate, or between the liquid crystal cell and the lower polarizing plate, or at least two compensating films are respectively inserted between the liquid crystal cell and the upper polarizing plate, and between the liquid crystal cell and the lower polarizing plate and an arrangement condition is such that a quasi fast axis vector of a compensating film and an easy axis vector of an electrode substrate nearer the compensating film of the liquid crystal cell satisfy an angular relation therebetween in the range of −30 to +30 degrees or +150 to +210 degrees.

A second aspect of the present invention is concerned with a liquid crystal display according to the first aspect of the present invention in which two compensating films are respectively inserted between the liquid crystal cell for drive and the upper polarizing plate, and between the liquid crystal cell and the lower polarizing plate to form a structure of the upper polarizing plate/upper compensating film/liquid crystal cell for drive/lower compensating film/lower polarizing plate, wherein an angle between a quasi fast axis vector of the upper compensating film and an easy axis vector of an upper electrode substrate of the liquid crystal cell, and an angle between a quasi fast axis vector of the lower compensating film and an easy axis vector of a lower electrode substrate of the liquid crystal cell are equal to each other.

A third aspect of the present invention is concerned with a liquid crystal display according to the first or second aspect of the present invention, wherein the discotic liquid crystal constituting a compensating film has a twisted orientational order such that a magnitude of a projected vector on a film plane of a director of the discotic liquid crystal changes along a thickness direction of the film.

BRIEF DESCRIPTION OF THE DRAWINGS

FIGS. 3(*a*) and (*b*) are representations illustrating a measuring method for an apparent retardation of a compensating film employed in the present invention. Left figure is a representation illustrating a structure of a measuring system including a measuring specimen and right figure is a representation illustrating axial directions of the constituent members, wherein 1, 2 indicate a transmission axis of the polarizing plate, 3 indicates a quasi slow axis of the compensating film and 4 indicates a quasi slow axis of an anisotropic element in which a retardation is continuously variable.

FIG. 6 is a representation, in the liquid crystal display used in Example 1, respectively of a perspective view (a), diagrams showing two configurations of axes of constituent members (b) and (c) and a diagram illustrating an azimuth angle Φ and a viewing angle θ(d), wherein:

1, 1' indicate a polarizing plate;
2 indicates a liquid crystal cell of a TN type for drive;
3, 3' indicate an electrode substrate having a rubbing polyimide film;
4, 4' indicate a compensating plate;
5, 5' indicate a substrate (a glass substrate having a rubbed polyimide film);
6, 6' indicates a film 1;
7, 7' indicate a transmission axis of a polarizing plate;
8, 8' indicate a rubbing direction (or an easy axis vector);
9, 9' indicate a quasi extinction axis of a film 1(or a fast axis vector); and
10, 10' indicate a rubbing direction of a substrate (or an alignment control force vector present in the A interface side of a film 1), which is omitted in FIG. 6(*a*).

Figure 7A:
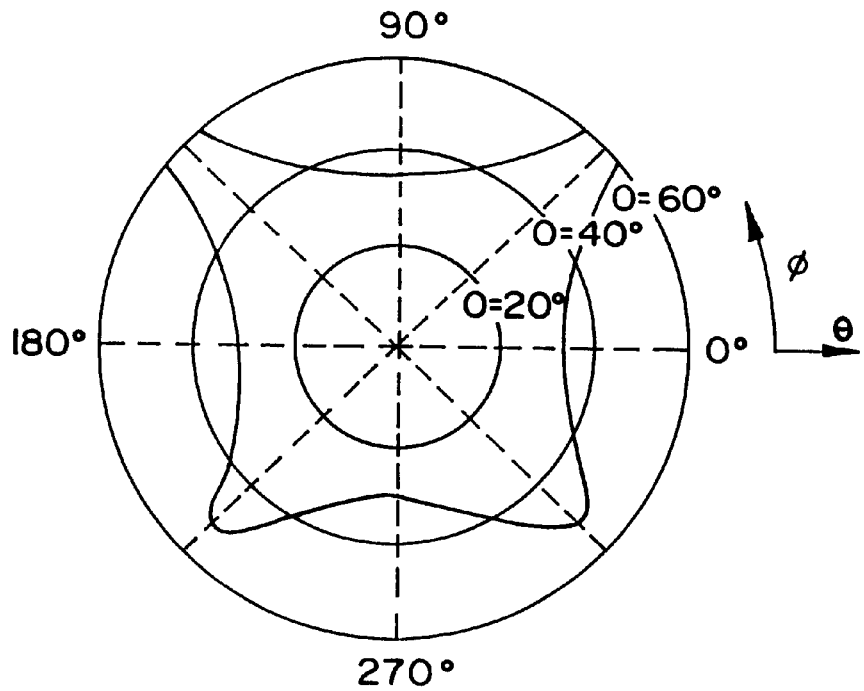
Figure 7B:
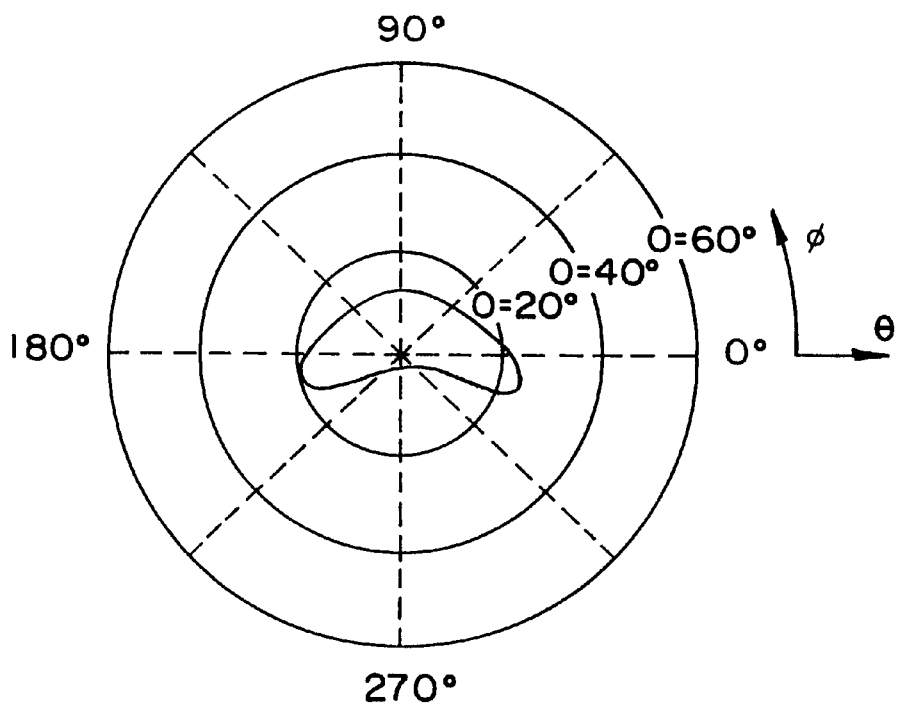

FIG. 7 is a diagram showing viewing angle characteristics obtained in Example 1, wherein a curve of each diagram is an iso-contrast curve with a contrast ratio of 100 and three concentric circles show respectively viewing angles θ of 20, 40 and 60 degrees. FIG. 7(*a*) is a diagram with the film 1 loaded (in the arrangement of FIG. 6) and FIG. 7(*b*) is a diagram with none of the film 1 loaded when compensating plates 4, 4' are not provided in FIG. 6, wherein the transmission axes 7, 7' of upper and lower polarizing plates are respectively rotated by 1 degree with respect to FIG. 6 to coincide with 8' and 8.

FIG. 8 is a representation, the liquid crystal display used in Example 2, respectively of a perspective view (a), diagrams showing two configurations of axes of constituent members (b) and (c) and a diagram illustrating an azimuth angle Φ and a viewing angle θ(d), wherein:

1, 1' indicate a polarizing plate;
2 indicates a liquid crystal cell of a TN type for drive;
3, 3' indicate an electrode substrate having a rubbed polyimide film;
4, 4' indicate a compensating plate;
5, 5' indicate a substrate (a glass substrate having a rubbed polyimide film);

6, 6' indicates a film 1;
7, 7' indicate a transmission axis of a polarizing plate;
8, 8' indicate a rubbing direction (or an easy axis vector);
9, 9' indicate a quasi extinction axis of a film 1(or a quasi fast axis vector); and
10, 10' indicate a rubbing direction of a substrate (or an alignment control force vector present in the A interface of a film 1), which is omitted in FIG. 8(a).

Figure 9A:
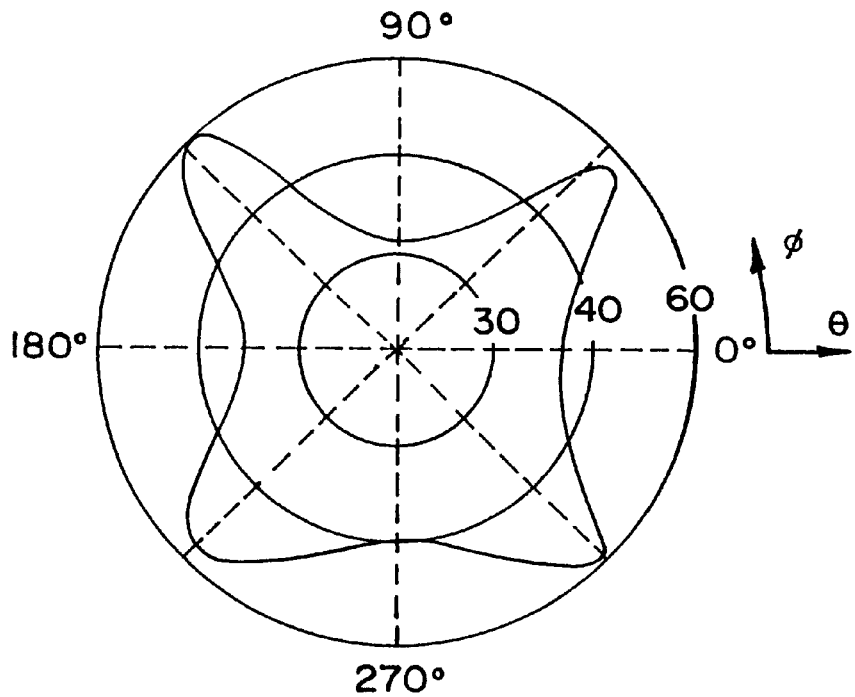
Figure 9B:
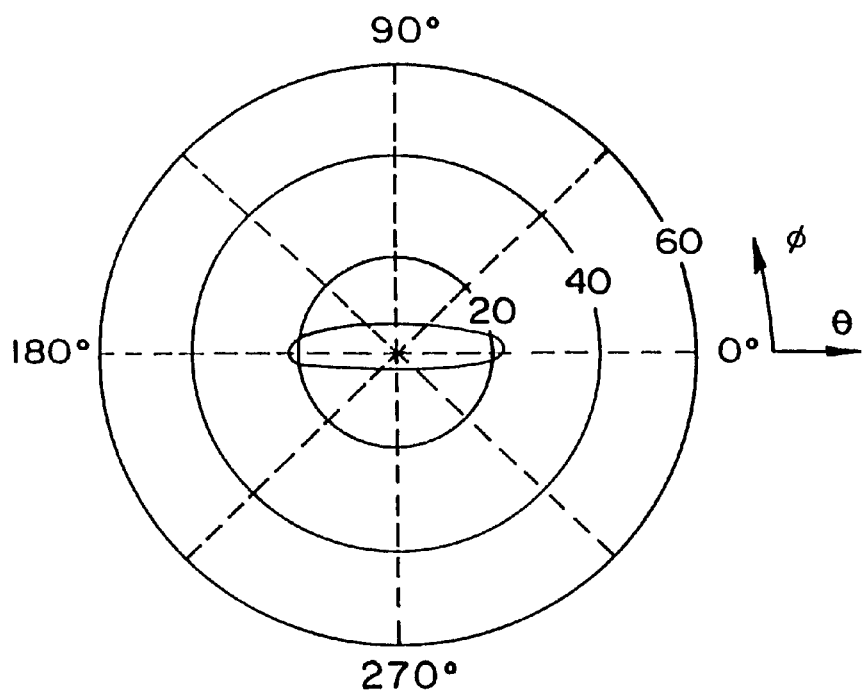

FIG. 9 is a diagram showing viewing angle characteristics obtained in Example 2, wherein a curve of each diagram is an iso-contrast curve with a contrast ratio of 100 and three concentric circles show respectively viewing angles θ of 20, 40 and 60 degrees. FIG. 9(a) is a diagram with the film 1 loaded (in the arrangement of FIG. 7) and FIG. 9(b) is a diagram with none of the film 1 when compensating plates 4, 4' are not provided in FIG. 7, wherein the transmission axes 7, 7' of upper and lower polarizing plates are respectively rotated by 1 degree with respect to FIG. 6 to coincide with 8' and 8.

FIG. 10 is a representation, in the liquid crystal display used in Example 3, respectively of a perspective view (a), diagrams showing two configurations of axes of constituent members (b) and (c) and a diagram illustrating an azimuth angle Φ and a viewing angle θ(d), wherein:
1, 1' indicate a polarizing plate;
2 indicates a liquid crystal cell of a TN type for drive;
3, 3' indicate an electrode substrate having a rubbed polyimide film;
4, 4' indicate a compensating plate;
5, 5' indicate a substrate (a glass substrate having a rubbed polyimide film);
6, 6' indicates a film 1;
7, 7' indicate a transmission axis of a polarizing plate;
8, 8' indicate a rubbing direction (or an easy axis vector);
9, 9' indicate a quasi extinction axis of film 1 (or a quasi fast axis vector); and
10, 10' indicate a rubbing direction of a substrate (or an alignment control force vector present in the A interface side of a film 1), which is omitted in FIG. 10(a).

Figure 11A:
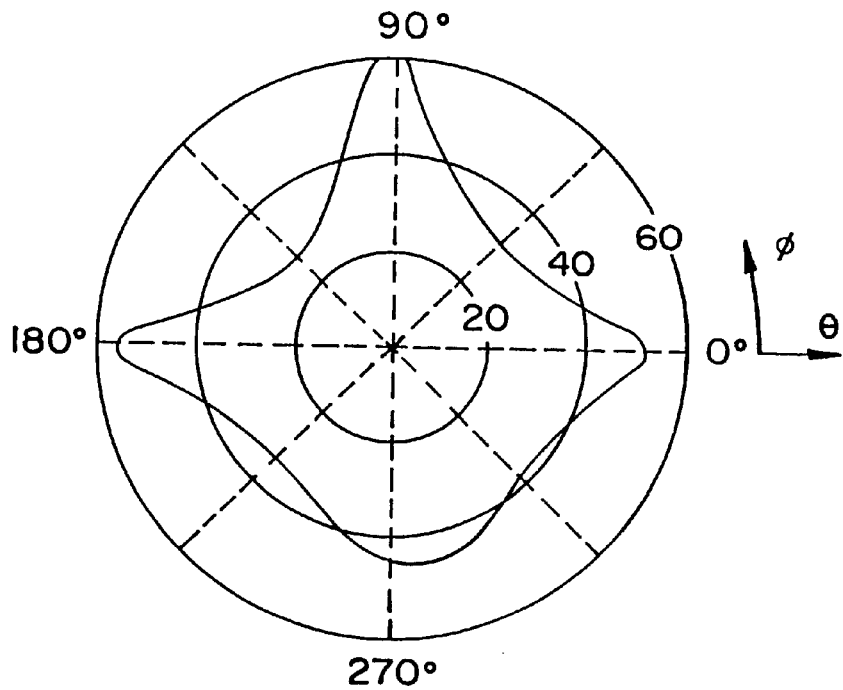
Figure 11B:
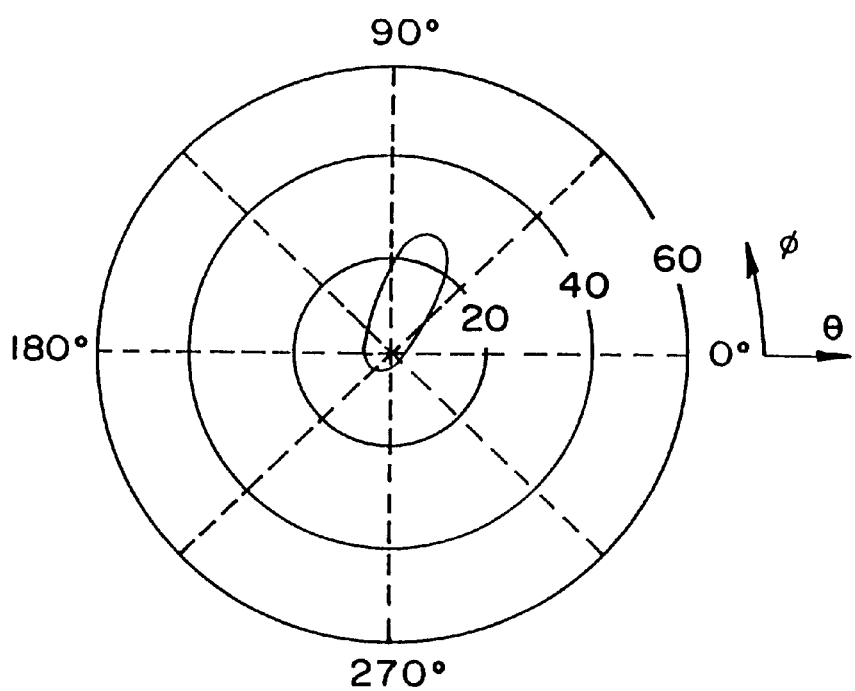

FIGS. 11(a) and (b) are diagrams showing viewing angle characteristics obtained in Example 3, wherein a curve of each diagram is an iso-contrast curve with a contrast ratio of 100 and three concentric circles show respectively viewing angles θ of 20, 40 and 60 degrees. FIG. 11(a) is a diagram with the film 1 loaded (in the arrangement of FIG. 10(a)) and FIG. 11(b) is a diagram with none of the film 1 loaded when compensating plates 4, 4' are not provided in FIG. 10, wherein the transmissive axes 7, 7' of upper and lower polarizing plates are unchanged and kept at the same positions as in FIG. 10(a).

FIG. 12 is a representation, in the liquid crystal display used in Example 4, respectively of a perspective view (a), diagrams showing two configurations of axes of constituent members (b) and (c) and a diagram illustrating an azimuth angle Φ and a viewing angle θ(d), wherein:
1, 1' indicate a polarizing plate;
2 indicates a liquid crystal cell of a TN type for drive;
3, 3' indicate an electrode substrate having a rubbed polyimide film;
4 indicates a compensating plate;
5 triacetyl cellulose film (including an adhesive layer);
6 indicates a film 2;
7, 7' indicate a transmission axis of a polarizing plate;
8, 8' indicate a rubbing direction (or an easy axis vector); ±9 indicates a quasi extinction axis of film 2 (or a quasi fast axis vector); and
10 indicates a rubbing direction of a polyimide film used as an alignment substrate (or an alignment control force vector present on the A interface side of a film 2), which is omitted in FIG. 12(a).

Figure 13A:
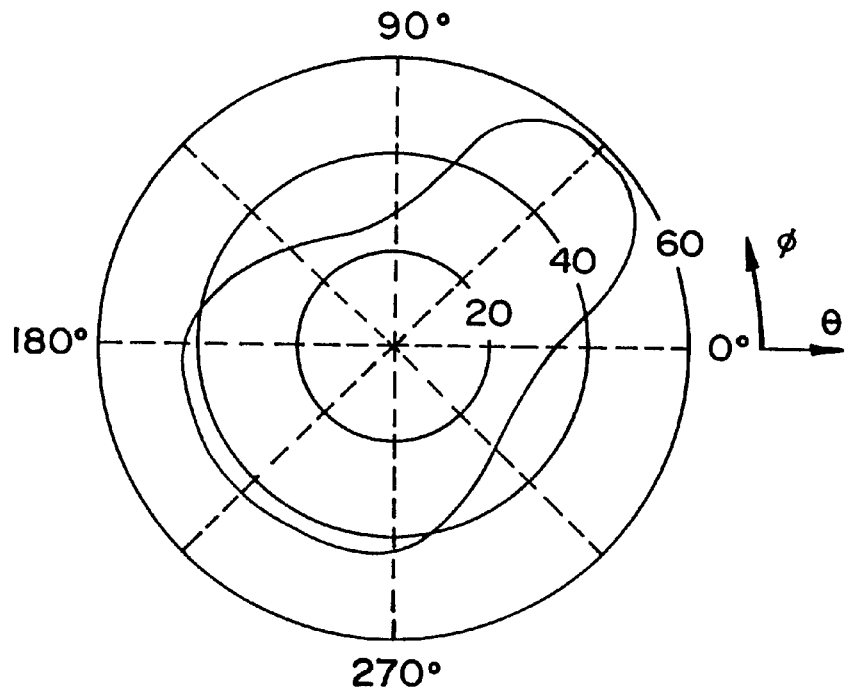
Figure 13B:
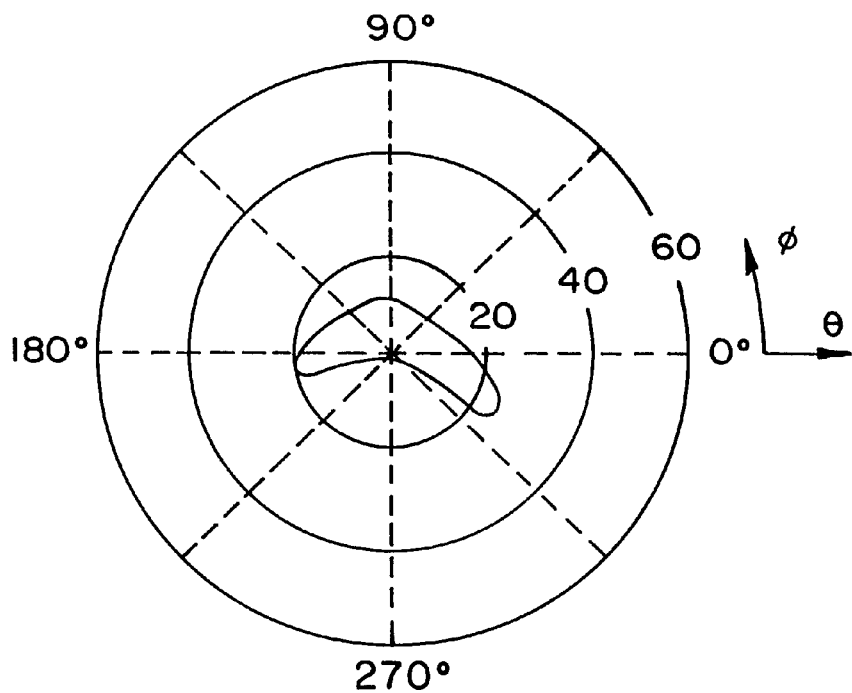

FIGS. 13(a) and (b) are diagrams showing viewing angle characteristics obtained in Example 4, wherein a curve of each diagram is an iso-contrast curve with a contrast ratio of 100 and three concentric circles show respectively viewing angles θ of 20, 40 and 60 degrees. FIG. 13(a) is a diagram with the film 2 loaded (in the arrangement of FIG. 12) and FIG. 13(b) is a diagram with none of the film 2 loaded when a compensating plate 4 is not provided in FIG. 12, wherein the other constituent members are unchanged and kept as in FIG. 12.

Figure 14A:
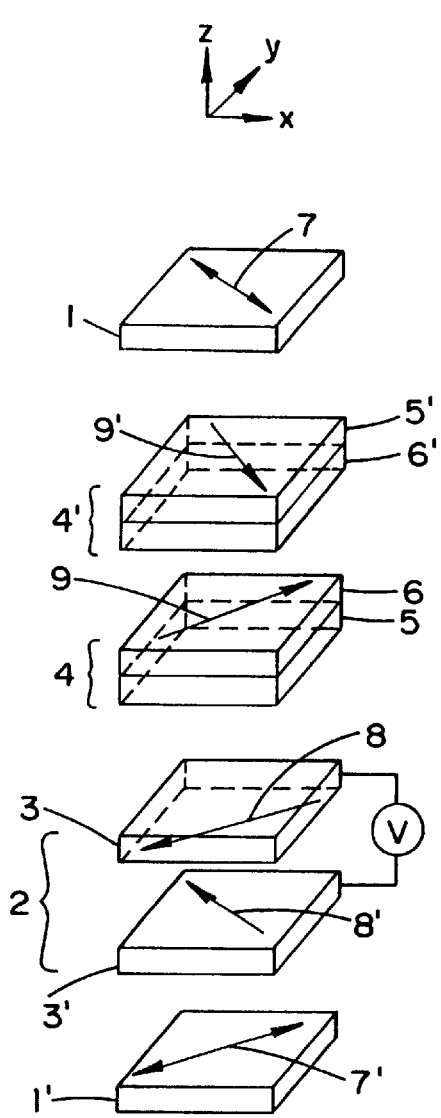
Figure 14B:
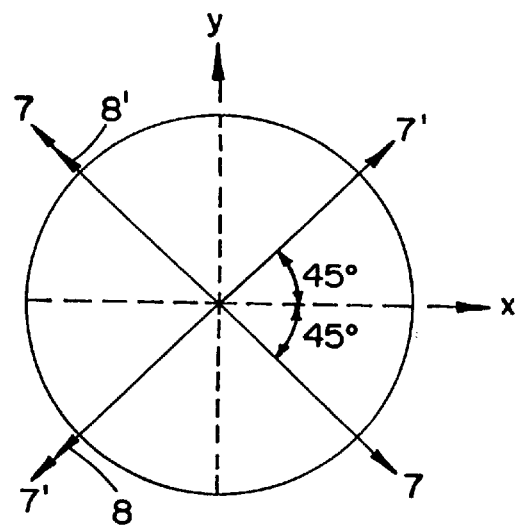
Figure 14C:
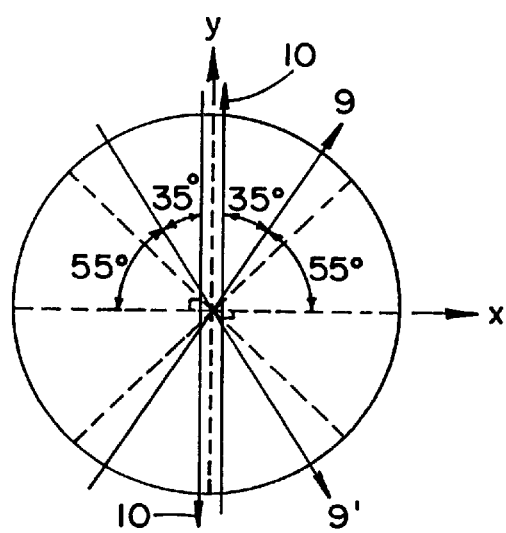
Figure 14D:
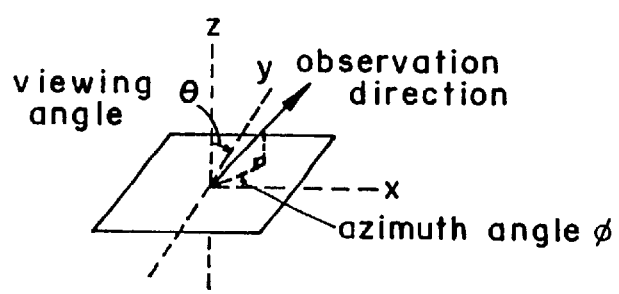

FIG. 14 is a representation, in the liquid crystal display used in Example 5, respectively of a perspective view (a), diagrams showing two configurations of axes of constituent members (b) and (c) and a diagram illustrating an azimuth angle Φ and a viewing angle θ(d), wherein:
1, 1' indicate a polarizing plate;
2 indicates a liquid crystal cell of a TN type for drive;
3, 3' indicate an electrode substrate having a rubbed polyimide film;
4, 4' indicate a compensating plate;
5, 5' triacetyl cellulose film (including an adhesive layer);
6, 6' indicate a film 3;
7, 7' indicate a transmission axis of a polarizing plate;
8, 8' indicate a rubbing direction (or an easy axis vector);
9, 9' indicate a quasi extinction axis of a film 3 (or a quasi fast axis vector); and
10, 10' indicate a rubbing direction of a polyimide film used as an alignment substrate (or an alignment control force vector present in the A interface side of a film 3), which is omitted in FIG. 14(a).

Figure 15:
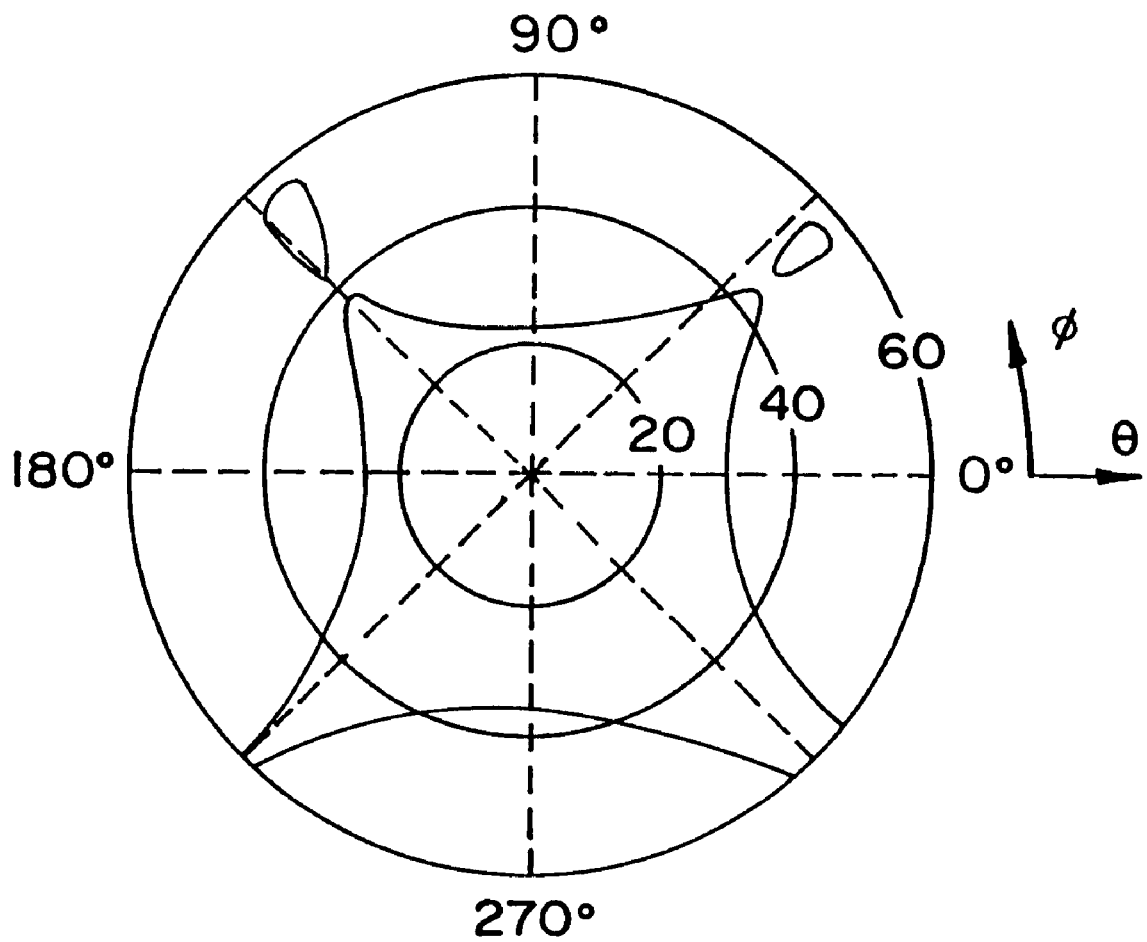

FIG. 15 is a diagram showing viewing angle characteristics obtained in Example 5, wherein a curve of each diagram is an iso-contrast curve with a contrast ratio of 100 and three concentric circles show respectively viewing angles θ of 20, 40 and 60 degrees.

FIG. 16 is a representation, in the liquid crystal display used in Example 6, respectively of a perspective view (a), diagram showing two configurations of axes of constituent member (b) and (c) and a diagram illustrating an azimuth angle Φ and a viewing angle θ(d), wherein:
1, 1' indicate a polarizing plate;
2 indicates a liquid crystal cell of a TN type for drive;
3, 3' indicate an electrode substrate having a rubbed polyimide film;
4, 4' indicate a compensating plate;
5, 5' triacetyl cellulose film (including an adhesive layer)
6, 6' indicate a film 4;
7, 7' indicate a transmission axis of a polarizing plate;
8, 8' indicate a rubbing direction (or an easy axis vector);
9, 9' indicate a quasi extinction axis of a film 5 (or a quasi fast axis vector); and
10, 10' indicate a rubbing direction of a polyvinyl alcohol film used as an alignment substrate (or an alignment control force vector present in the A interface side of film 5), which is omitted in FIG. 16(a).

Figure 17:
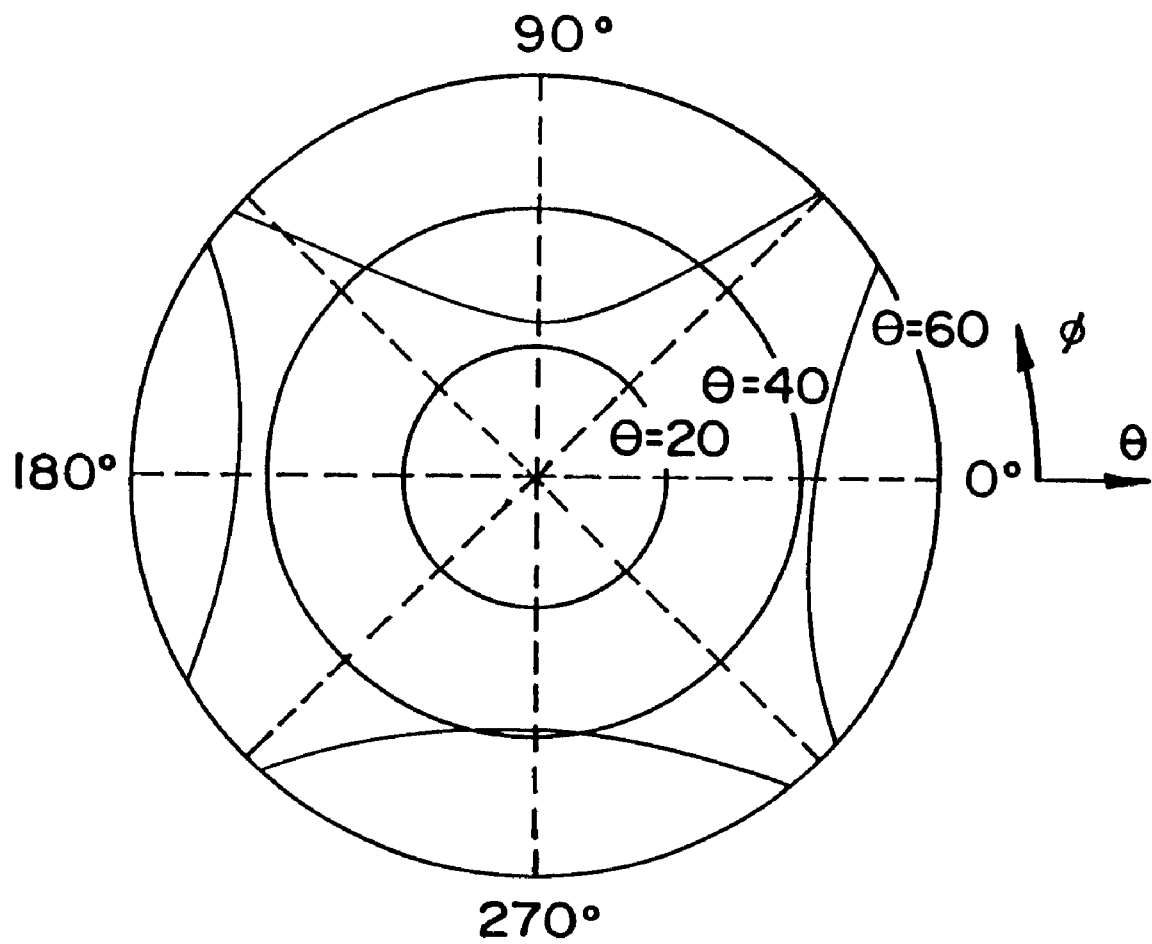

FIG. 17 is a diagram showing viewing angle characteristics obtained in Example 6, wherein a curve of each diagram is an iso-contrast curve with a contrast ratio of 100 and three concentric circles show respectively viewing angles θ of 20, 40 and 60 degrees.

Figure 18A:
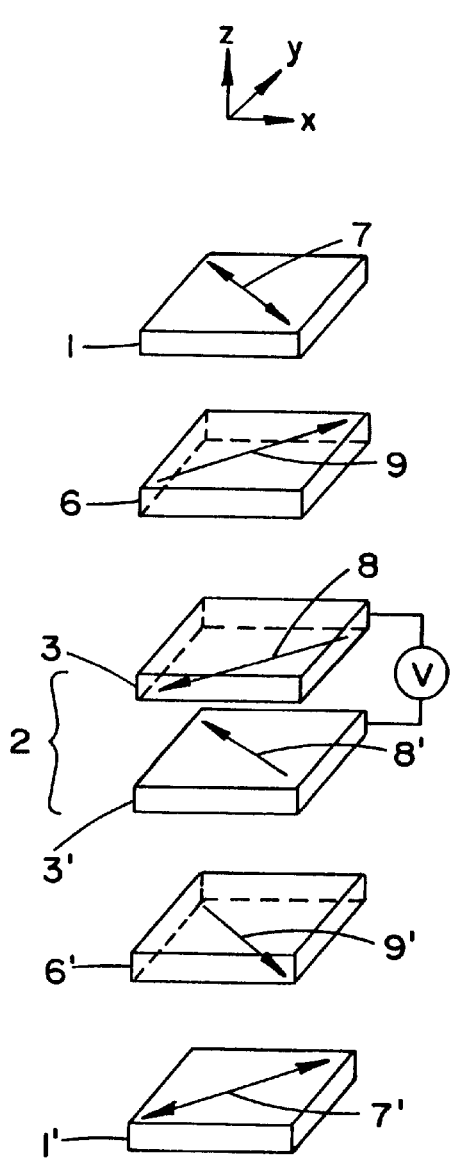
Figure 18B:
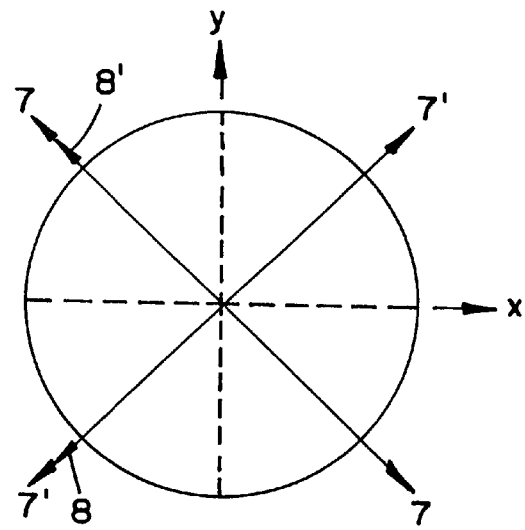
Figure 18C:
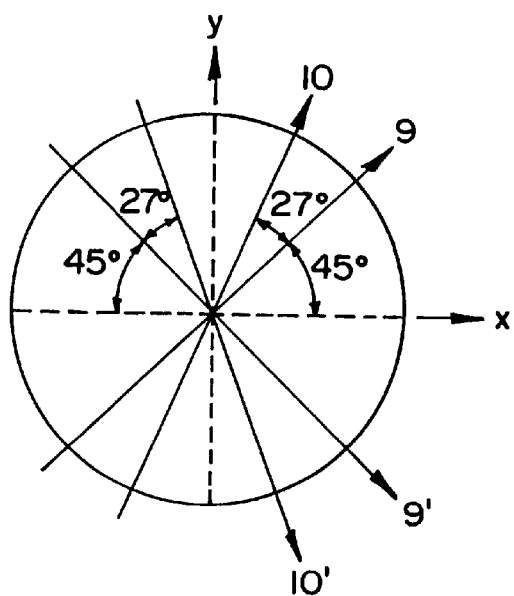
Figure 18D:
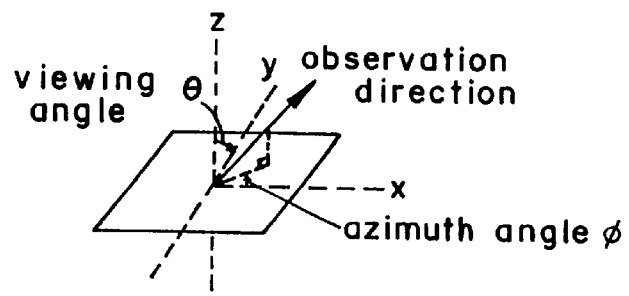

FIGS. 18(a) to (d) are representations, in the liquid crystal display used in Example 7, respectively of a perspective view, diagrams showing two configurations of axes of constituent members and a diagram illustrating an azimuth angle Φ and a viewing angle θ, wherein:
1, 1' indicate a polarizing plate;
2 indicates a liquid crystal cell of a TN type for drive;
3, 3' indicate an electrode substrate having a rubbed polyimide film;

6, 6' indicate a film 5;
7, 7' indicate a transmission axis of a polarizing plate;
8, 8' indicate a rubbing direction (or an easy axis vector);
9, 9' indicate a false extinction axis of film 2 (or a fast axis vector); and
10, 10' indicate an alignment control force vector present in the A interface side of film 5, which is omitted in FIG. 18(a), wherein while members 1 and 6, and members 1' and 6' are respectively made to be adhered to each other to be one body with an adhesive interposing therebetween, they are shown in the figure separately, and the adhesive and adhesive layer on 6 and 6' are omitted in the figure.

Figure 19:
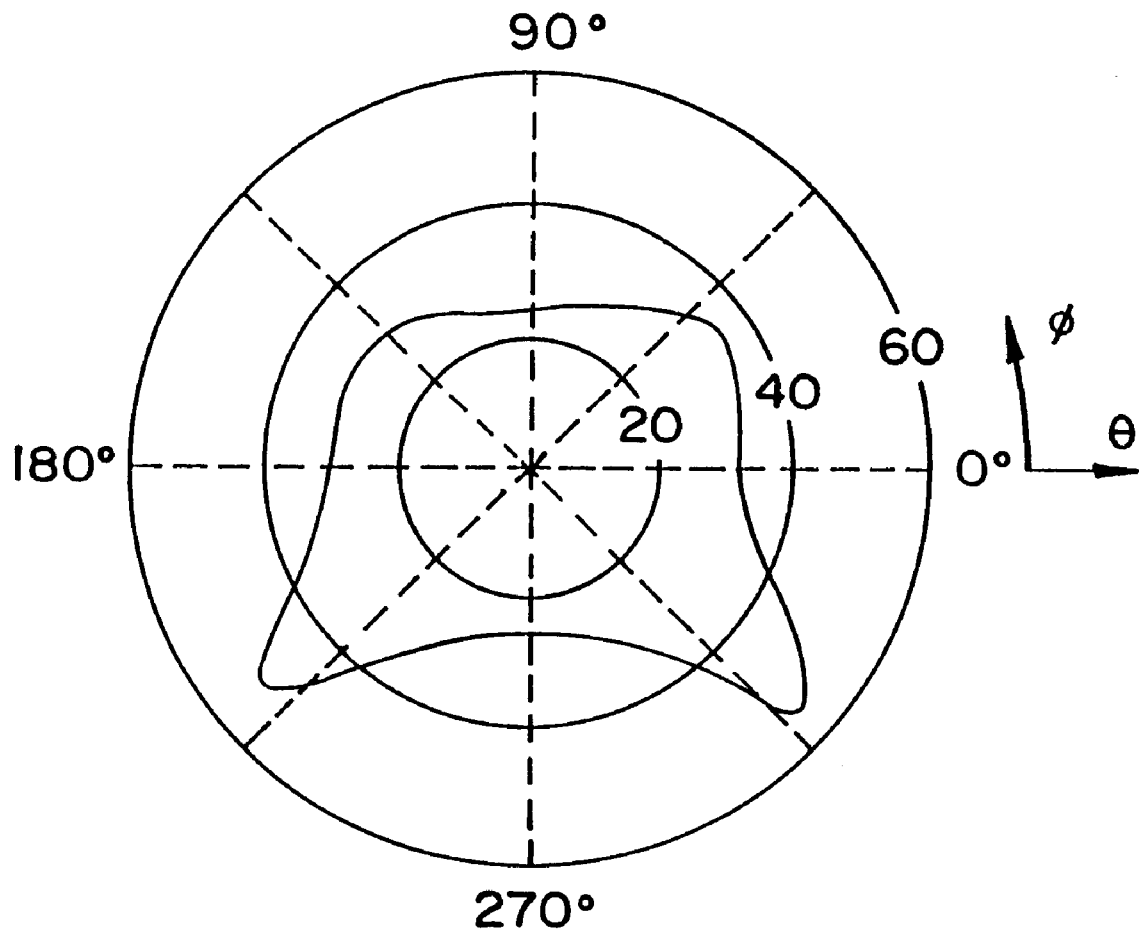

FIG. 19 is diagram showing viewing angle characteristics obtained in Example 7, wherein a curve of each diagram is an iso-contrast curve with a contrast ratio of 100 and three concentric circles show respectively viewing angles θ of 20, 40 and 60 degrees.

DETAILED DESCRIPTION OF THE INVENTION

The present invention will further be described in a detailed manner below.

A compensating film which is used in the present invention will first be described. The compensating film has optical parameters such that a quasi extinction axis angle of 5 to 90 degrees as an absolute value, an optical rotating angle of 0.5 to 10 degrees as an absolute value, wherein signs of the extinction axis angle and the optical rotating angle are contrary to each other. As a compensating film used in the present invention, there is no specific limitation but any film which satisfies the above mentioned conditions for optical parameters can be used. The optical parameters will be detailed later.

In the present invention, as the above mentioned compensating film, a film is especially preferred, in which a projected vector of a director of a discotic liquid crystal changes along a thickness direction, and which has a twisted orientational order. The orientational order of the compensating film is shown in FIG. 1.

Figure 1A:
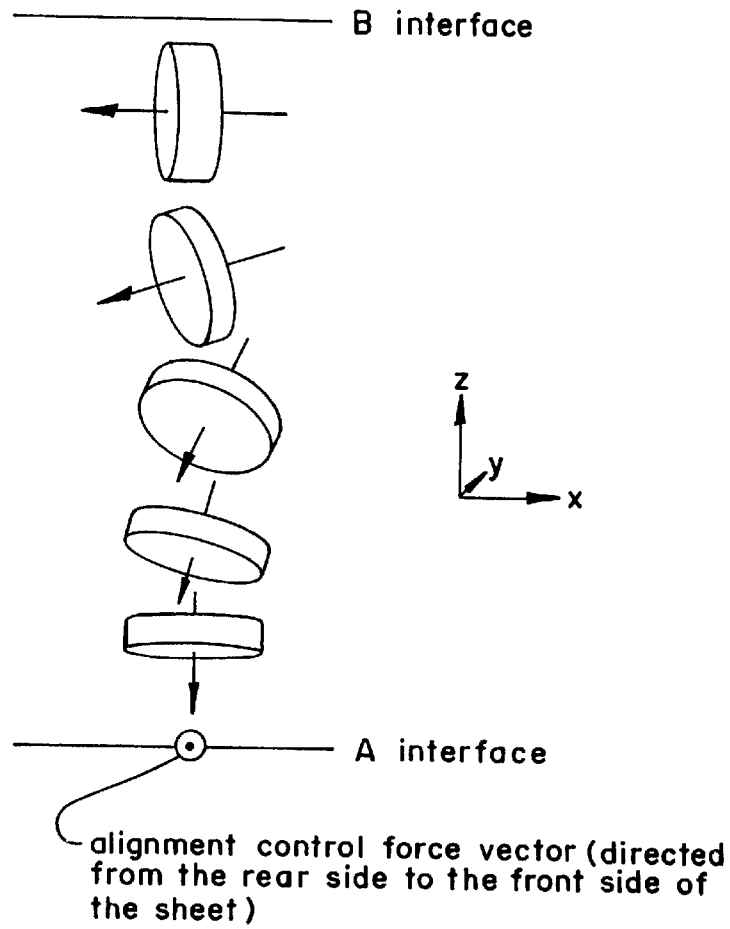
FIG. 1(*a*) is a view showing a model of orientation of a discotic liquid crystal in a compensating film used in the present invention, wherein (a), an arrow in this figure indicates a director of the discotic liquid crystal and the director has a head and tail, discernible from each other, according to a definition herein, and in an x y z coordinate system used in the figure, the sheet surface including the figure is a z x plane and a direction normal to the sheet surface is a y axis, and FIG. 1(*b*) is a view showing, as a model, a change along a thickness direction of a projected vector on an x y plane of a director of the discotic liquid crystal.

An arrow in FIG. 1(a) is a director of a discotic liquid crystal. The director of the discotic liquid crystal is essentially a unit vector that has no distinction between fore and rear ends thereof, while a vector is expressed as a single headed arrow with a head at one end for description of an orientational order. The arrow is drawn so as to be directed to the A interface from the B interface. The A interface is an interface to which a director forms a larger angle. The B interface is the other interface of FIG. 1(a). The A interface corresponds to a interface which abuts on an alignment substrate described later.

Figure 1B:
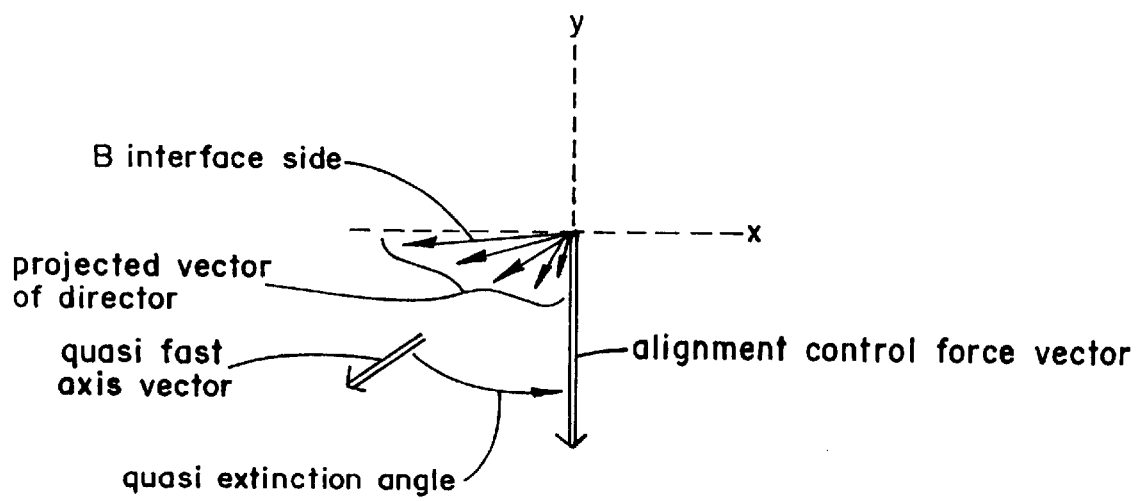

FIG. 1(b) shows a projected vector of a director on the film plane. A compensating film used in the present invention has a twist structure as shown in FIG. 1(a) and therefore a direction of a projected vector rotates according to a depth in a thickness direction. Besides, in the compensating film since an inclination to the film surface of a director also changes along the thickness direction and therefore a magnitude of a projected vector changes along the thickness direction. A side in which a magnitude of the projected vector is larger is the B interface side and a side in which a magnitude of the projected vector is smaller is the A interface side. A twist direction of a liquid crystal in a compensating film is defined by which direction the point of a projected vector at an observing position is rotated to as the observing position approaches to the A interface from the B interface side when view from the B interface side. In the present invention, if the sense of rotation is clockwise or counterclockwise, it is defined as right twist or left twist.

A compensating film having the orientational order will be described in a further more detailed manner. The compensating film is made of a liquid crystal material having at least a chiral discotic nematic phase.

A discotic liquid crystal is categorized by orientational orders of molecules thereof ND phase (discotic nematic), Dho phase (hexagonal ordered columnar phase), Dhd phase (hexagonal disordered columnar phase), Drd phase (rectangular disordered columnar phase) and Dob phase (oblique columnar phase) by C. Destrade et al., (see C. Destrade et al., Mol. Cryst. Liq. Cryst. 106, 121 (1984)). In the present invention, a discotic liquid crystalline material in a liquid crystal state is aligned into a desired structure. Therefore, as a liquid crystal material for a start, a liquid crystal having at least a chiral discotic nematic phase is an indispensable component. The chiral discotic nematic phase is a liquid crystal phase conferred with a twist structure. A discotic liquid crystal, which has no chiral discotic nematic phase, but which has the above described columnar phase (Dho phase, Dhd phase, Dob phase or a phase added with a twist structure) is hard to attain a uniform orientation order because of a high degree of order between molecules.

A compensating film used in the present invention is preferably a film which has been subjected to a fixation process by photo cross-linking. The fixation by photo cross-linking is necessarily required from a stand point of an optical performance. It is, however, preferable in a practical sense for a film to be subjected to the fixation process in order that orientation of a discotic liquid crystal in the compensating film is hard to be disturbed by heat or an external force.

The fixation process itself has a high risk that the process is accompanied with a disturbance in an orientational order. Therefore, a film is applied with a cooling operation after a intended twist structure is attained and thereafter a fixation process is preferably given to the film. With such a cooling operation, a discotic liquid crystal is obtainable in a state of a lower fluidity. In this state, the film is subjected to a next fixation process by photo cross-linking and thereby the film can be prevented from disturbance in orientational order to be caused by photo cross-linking.

From a view point from a liquid crystal material, a material is preferred which has a columnar and/or crystalline phase in a lower temperature range than that in which the material has a chiral discotic nematic phase. When such a discotic liquid crystal material is used, a film is provided with a uniform twist orientation in a chiral discotic nematic phase and thereafter, a rapid cooling is applied to the film, whereby an orientational order obtained in the chiral discotic nematic phase is not disturbed and only a fluidity of the material can be deleted. Disturbance by photo cross-linking can be prevented from occurring with application of this operation.

As a discotic liquid crystal constituting a liquid crystal having properties as mentioned above, the liquid crystal has at least a portion which reveals a liquid crystal phase (called mesogen), a group having a property of photopolymerization, for example an acrylic or methacrylic group and a chiral substituent which induces a twisted orientation. A mesogen, a substituent having a photopolymerization nature or a chiral substituent may be present in a single discotic liquid crystal molecule or in a different molecule of the same kind. In addition to this, a substituent having a photopolymerization nature or a chiral substituent is not necessarily required to be present in a discotic liquid crystal molecule. A typical examples of the latter case is a composition composed of, for example a discotic liquid crystal having no substituent of a polymerization nature, a chemical compound having a photopolymerization nature, for example an ordinary acrylic monomer showing no a liquid crystal nature and an optically active compound having a chiral substituent, wherein the composition has the above mentioned properties.

A liquid crystal material to be provided to the present invention has the following materials as indispensable major components:
1) a discotic liquid crystal having a chiral substituent and a substituent having a photopolymerization nature;
2) a composition composed of a discotic liquid crystal having a chiral substituent and a discotic liquid crystal having a substituent of a photopolymerization nature;
3) a composition composed of a discotic liquid crystal having neither a chiral substituent nor a substituent of a polymerization nature, a chemical compound having a photopolymerization nature and an optically active compound having a chiral substituent;
4) a composition composed of a discotic liquid crystal having a chiral substituent and a chemical compound having a photopolymerization nature; and
5) a composition composed of a discotic liquid having a substituent of a polymerization nature and an optically active compound having a chiral substituent.

The followings are examples of a discotic liquid crystal which can be provided for the present invention, but it should be understood that the present invention is not limited to them.

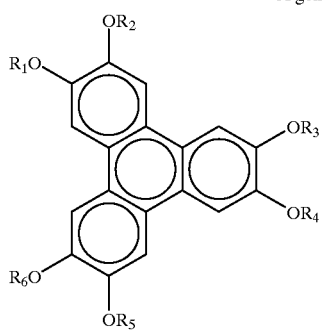

A general formula (I)

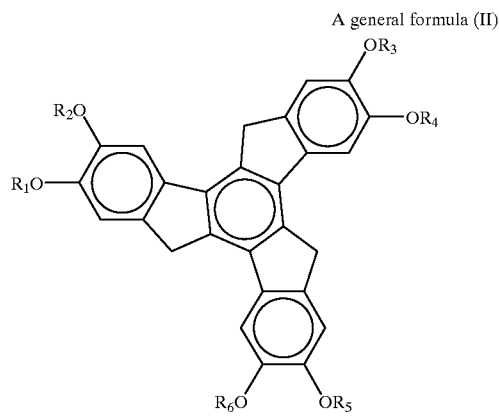

A general formula (II)

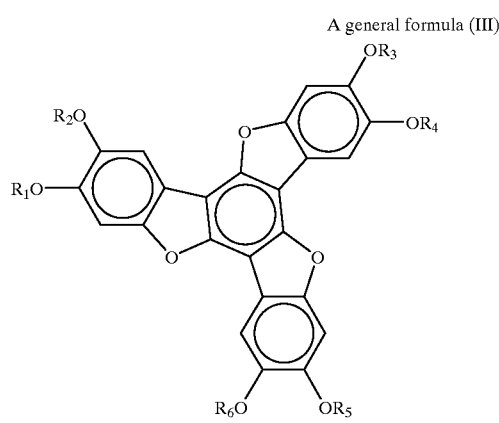

A general formula (III)

In the above described general formulae (I), (II) and (III), $R_1$, $R_2$, $R_3$, $R_4$, $R_5$ and $R_6$ each are a substituent selected from the group consisting of the following groups A, B and C, wherein in a liquid crystal material described in 1), 2), 4) and 5), there is included at least one kind of discotic liquid crystal expressed by the general formulae (I), (II) and (III), which has one kind or a plurality of kinds of substituents selected from at least the group A and/or group B and in the liquid crystal material described in 3), there is included at least one kind of discotic liquid crystal expressed by the general formulae (I), (II) and (III), which has one kind or a plurality of kinds of substituents selected from the group B.

Group A

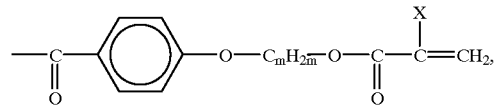

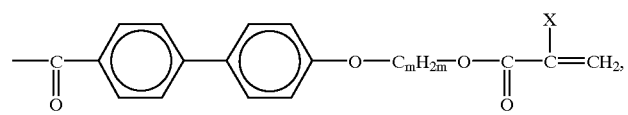

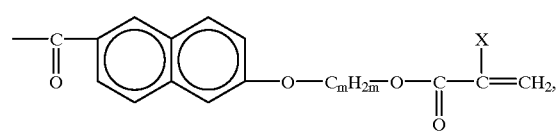

-continued
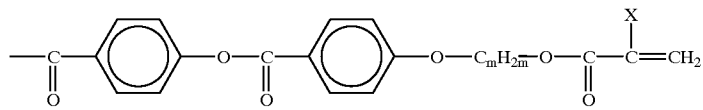
, wherein m is any one integral number of 2 to 14, or more preferably of 2 to 8 and X is H or $CH_3$.
Group B
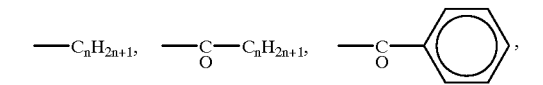
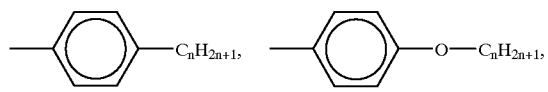
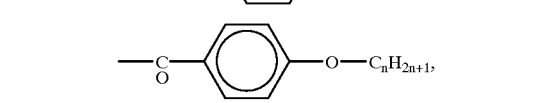
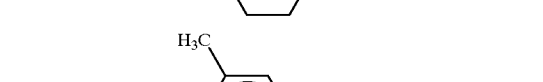
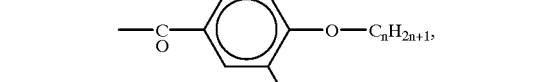
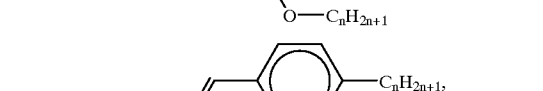
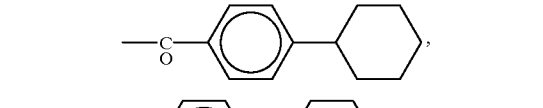
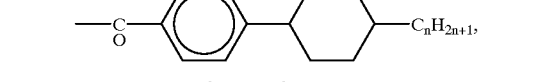
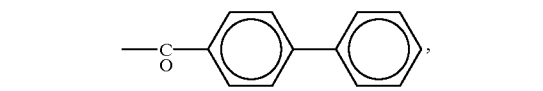
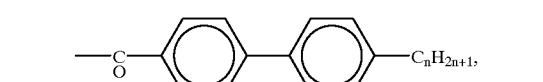
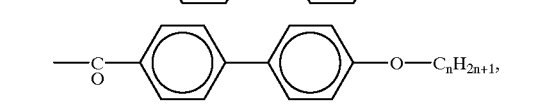
-continued
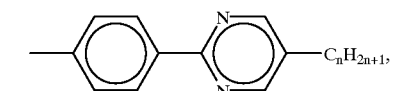
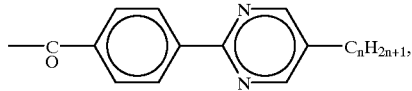
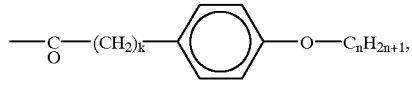
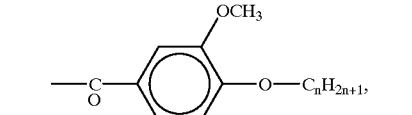
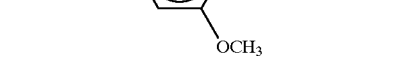
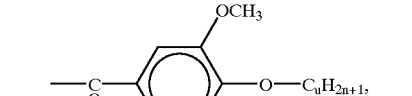
, wherein $C_nH_{2n+1}$ is an alkyl group, straight chain or branched chain, n is any one integer of 1 to 18, or more preferably of 3 to 14 and k is any one integer of 1 to 3.
Group C
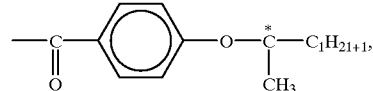
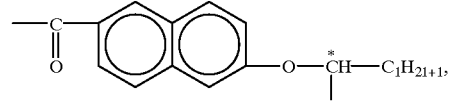
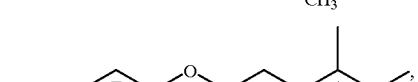
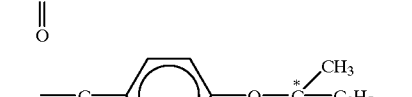

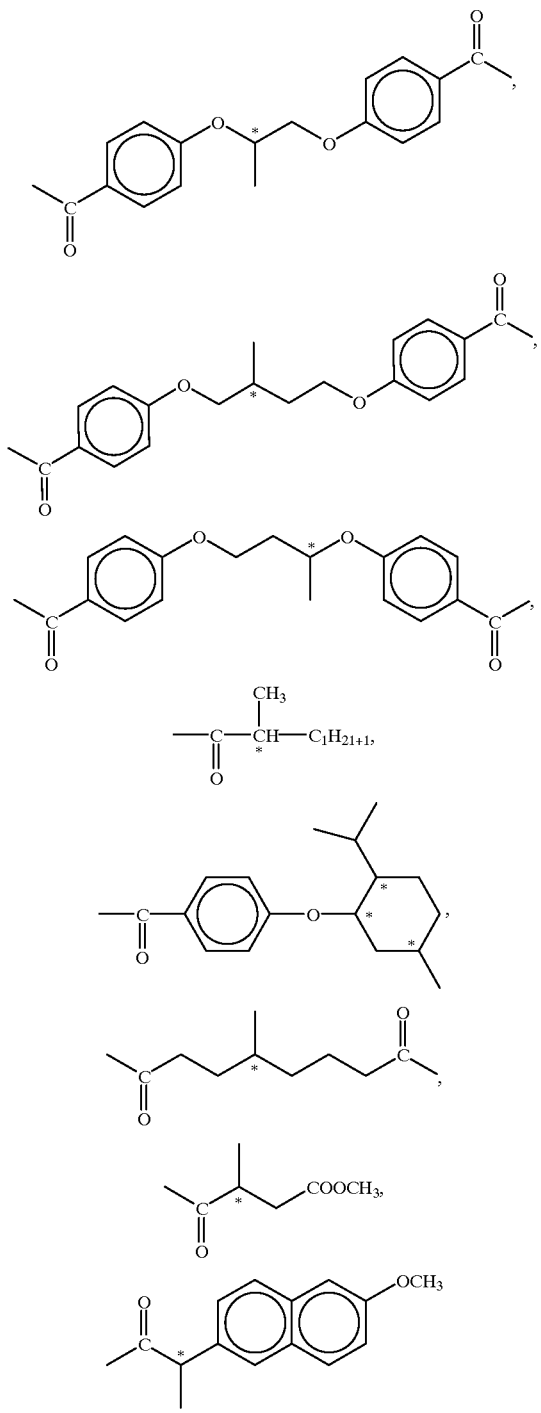

the like, wherein * indicates an asymmetric carbon and l is any one integer of 2 to 9.

In a more concrete manner, the following chemical compounds can be exemplified.

All of the $R_1$, $R_2$, $R_3$, $R_4$, $R_5$ and $R_6$ in the general formula (I) are compounds expressed by

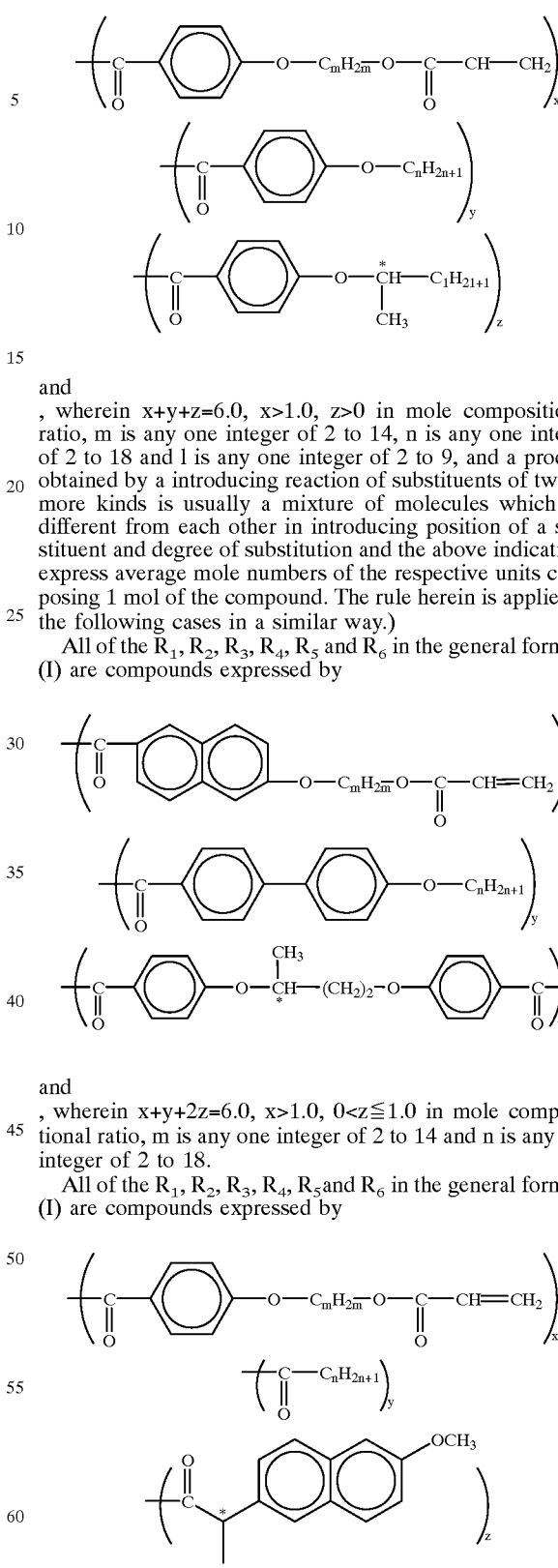

and
, wherein x+y+z=6.0, x>1.0, z>0 in mole compositional ratio, m is any one integer of 2 to 14, n is any one integer of 2 to 18 and l is any one integer of 2 to 9, and a product obtained by a introducing reaction of substituents of two or more kinds is usually a mixture of molecules which are different from each other in introducing position of a substituent and degree of substitution and the above indications express average mole numbers of the respective units composing 1 mol of the compound. The rule herein is applied to the following cases in a similar way.)

All of the $R_1$, $R_2$, $R_3$, $R_4$, $R_5$ and $R_6$ in the general formula (I) are compounds expressed by

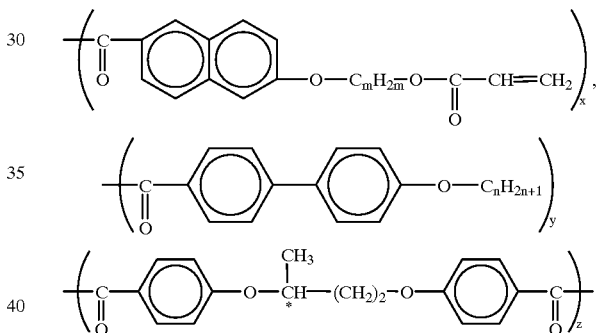

and
, wherein x+y+2z=6.0, x>1.0, 0<z≦1.0 in mole compositional ratio, m is any one integer of 2 to 14 and n is any one integer of 2 to 18.

All of the $R_1$, $R_2$, $R_3$, $R_4$, $R_5$ and $R_6$ in the general formula (I) are compounds expressed by

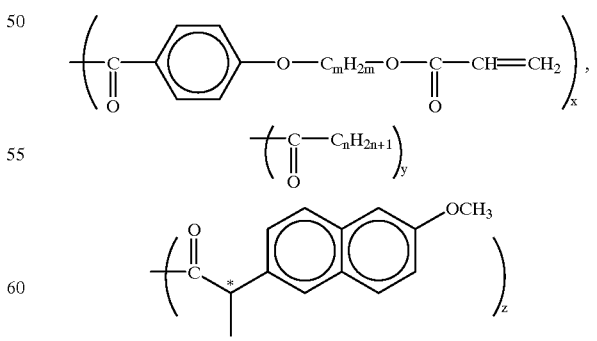

and
, wherein x+y+z=6.0, x>1.0, z>0 in mole compositional ratio, m is any one integer of 2 to 14 and n is any one integer of 2 to 18.

A composition composed of a compound of the general formula (I), in which each of the $R_1$, $R_2$, $R_3$, $R_4$, $R_5$ and $R_6$ is a compound expressed by

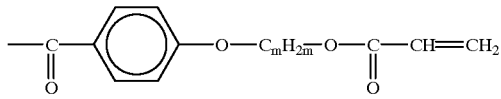

, wherein m is any one integer of 2 to 14 and a compound of the general formula (I), in which each of the $R_1$, $R_2$, $R_3$, $R_4$, $R_5$ and $R_6$ is a compound expressed by

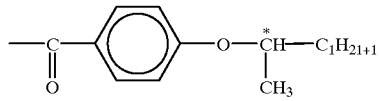

, wherein l is any one integer of 2 to 9.

All of the $R_1$, $R_2$, $R_3$, $R_4$, $R_5$ and $R_6$ in the general formula (II) are compounds expressed by

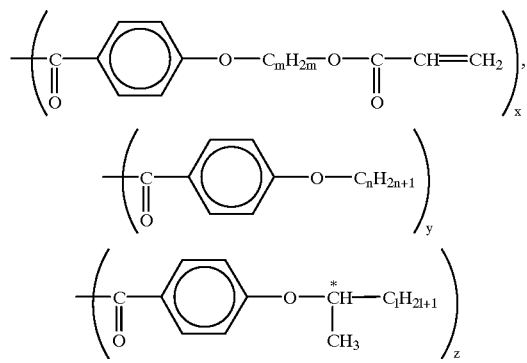

and
, wherein x+y+z=6.0, x>1.0, z>0 in mole compositional ratio, m is any one integer of 2 to 14, n is any one integer of 2 to 18 and l is any one integer of 2 to 9.

All of the $R_1$, $R_2$, $R_3$, $R_4$, $R_5$ and $R_6$ in the general formula (II) are compounds expressed by

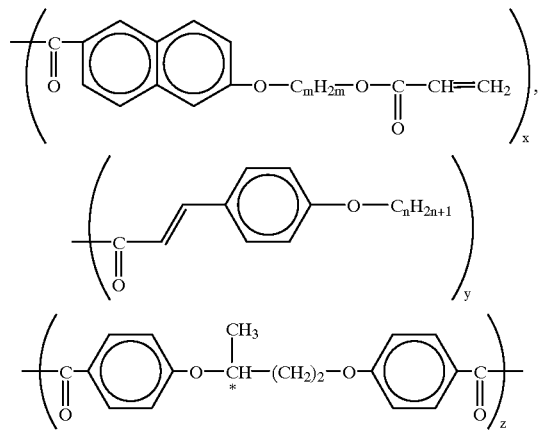

, wherein x+y+2z=6.0, x>10., 0<z≦1.0 in mole compositional ration, m is any one integer of 2 to 14, n is any one integer of 2 to 18 and the third substituent is a linkage group.

All of the $R_1$, $R_2$, $R_3$, $R_4$, $R_5$ and $R_6$ in the general formula (II) are compounds expressed by

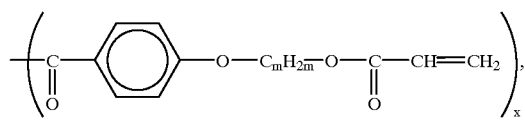
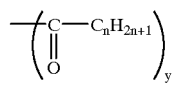
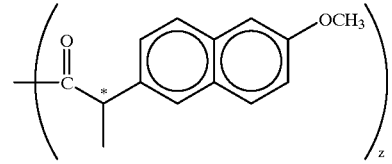

and
, wherein x+y+z=6.0, x>1.0, z>0 in mole compositional ration, m is any one integer of 2 to 14 and n is any one integer of 2 to 18.

A composition composed of a compound of the general formula (II), in which each of the $R_1$, $R_2$, $R_3$, $R_4$, $R_5$ and $R_6$ is a compound expressed by

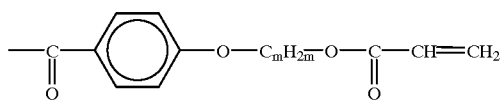

, wherein m is any one integer of 2 to 14 and a compound of the general formula (II), in which each of the $R_1$, $R_2$, $R_3$, $R_4$, $R_5$ and $R_6$ is a compound expressed by

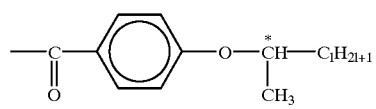

, wherein l is any one integer of 2 to 9.

All of the $R_1$, $R_2$, $R_3$, $R_4$, $R_5$ and $R_6$ in the general formula (III) are compounds expressed by

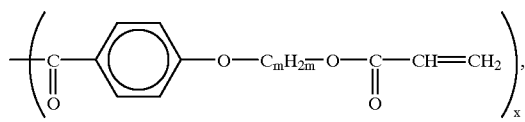
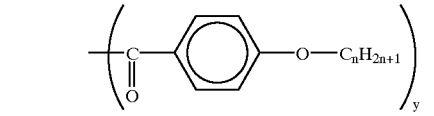
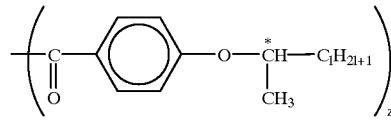

and
, wherein x+y+z=6.0, x>1.0, z>0 in mole compositional ratio, m is any one integer of 2 to 14, n is any one integer of 2 to 18 and l is any one integer of 2 to 9.

All of the $R_1$, $R_2$, $R_3$, $R_4$, $R_5$ and $R_6$ in the general formula (III) are compounds expressed by

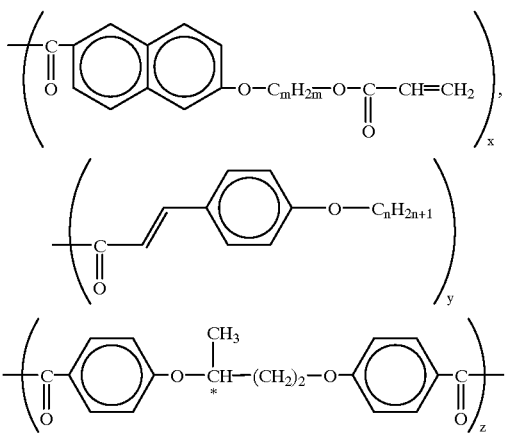

and
, wherein x+y+2z=6.0, x>1.0, 0<z≦1.0 in mole compositional ratio, m is any one integer of 2 to 14 and n is any one integer of 2 to 18.

All of the $R_1$, $R_2$, $R_3$, $R_4$, $R_5$, and $R_6$ in the general formula (III) are compounds expressed by

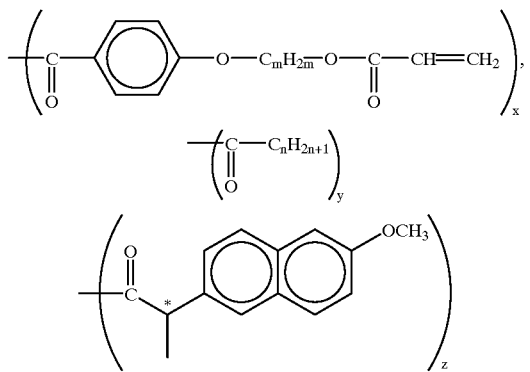

and
, wherein x+y+z=6.0, x>1.0, z>0 in mole compositional ratio, m is any one integer of 2 to 14 and n is any one integer of 2 to 18.

A composition composed of a compound of the general formula (III), in which each of the $R_1$, $R_2$, $R_3$, $R_4$, $R_5$ and $R_6$ is a compound expressed by

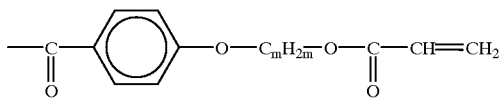

, wherein m is any one integer of 2 to 14; and a compound of the general formula (III), in which each of the $R_1$, $R_2$, $R_3$, $R_4$, $R_5$ and $R_6$ is a compound expressed by

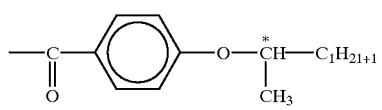

, wherein l is any one integer of 2 to 9.

When a difunctional substituent is used, a discotic liquid crystal is obtained as a oligomer composition or a polymer composition, in which mesogens are cross-linked There is no limitation to a stereochemical configuration of a chiral substituent in a liquid crystal but either of an S type and an R type may be used. However, there are inherently different natures for both types in that both types respectively give twists having opposed senses, and thereby one of both is selected according to an application. Though both types may be mixed, it is indispensable that one of both types is present in excess of the other. If a mixture is composed of both types at a 50 to 50 ratio a twist structure cannot be attained. Since a magnitude of twist is in approximate proportion to a quantity of a chiral substituent, a twist structure having a desired twist angle can be attained by controlling a quantity of the chiral substituent.

In the present invention, one kind or more kinds of discotic liquid crystal are components of a liquid crystal material.

In a discotic liquid crystal material used in the present invention, an optical initiator is included in addition to a discotic liquid crystal mentioned above. There is no specified restriction to an optical initiator but the following compounds are generally used, which are: for example, benzyl, benzoylether, benzoiniso-butyl ether, benzoinisopropyl ether, benzophenone, benzoylbenzoic acid, methylbenzoylbenzoate, 4-benzoyl-4'-methyldiphenylsulfide, benzylmethylketal, dimetylaminomethylbenzoate 2-n-butoxyethyl-4-dimethylaminobenzoate, p-dimethylaminobenzoic acid isoamyl, 3, 3'-dimethyl-4-methoxybenzophenone, methylobenzoylformate, 2-methyl-1-(4-(metylthio)phenyl)-2-morpholinopropane-1-on, 2-benzyl-2-dimethylamino-1-(4-morphlinophenyl)-butane-1-on, 1-(4-dodecylphenyl)-2-hydroxy-2-methylpropane-1-on, 1-hydroxycyclohexylphenylketon, 2-hydroxy-2-methyl-1-phenylpropane-1-on, 1-(4-isopropylphenyl)-2-hydroxy-2-methylpropane-1-on, 2-chlorothioxanthone, 2, 4-diethylthioxanthone, 2, 4-di-isopropylthioxanthone, 2, 4-dimethylthioxanthone, isopropylthioxanthone, 1-chloro-4-propoxythioxanthon and the like. These optical initiators can be used singly or as a mixture of two or kinds.

It is necessary to consider that a liquid crystal material does not lose its liquid crystal nature by adding an optical initiator. A quantity of an optical initiator to be added is usually in the range of 0.2 to 10 wt %, preferably 0.5 to 6 wt % or more preferably 1 to 6 wt % of a discotic liquid crystal. If a quantity is less than 0.2 wt %, there is a risk that a cross-linkage reaction does not advanced. On the other hand, if a quantity is beyond 10 wt %, a liquid crystal nature can be lost. It is possible to further add a sensitizer in the range in which it is not reduce effects of the present invention.

The following process steps are preferably employed in order to attain a compensating film whose twist structure is fixed by use of a discotic liquid crystal material as mentioned above.

In the present invention, a substrate (hereinafter referred to as alignment substrate) for forming a liquid crystal material film thereon and alignment thereof is used. An alignment substrate which can be used in fabrication of a compensating film is desirably a substrate which has an anisotropy so as to enable a director of a liquid crystal to be defined at the interface with the substrate. If the alignment substrate cannot define a direction of inclination of a liquid crystal at all, a uniform orientation order is hard to be attained in a film plane.

As an alignment substrate as mentioned above, the followings that have an anisotropy in a plane are preferred, which are, for example, a plastic substrate and uniaxially oriented film substrate made of polyimide, polyamideimide, polyamide, polyetheramide, polyetheretherketone, polyetherketone, polyketonsulfide, polyethersulfone, polysulfone, polyphenylenesulfide, polyphenyleneoxide, polyethyleneterephthalate, polybutyleneterephthalate, polyethylenenaphthalate, polyacetal, polycarbonate, polyarylate, acrylic resin, polyvinylalcohol, polypropylene, cellulose base plastics, epoxy resin, phenol resin and the like, a metal substrate made of aluminum, iron, copper or the like whose surface has grooves like a slit, and a glass substrate such as alkali glass, borosilicate glass, flint glass and the like whose surface is subjected to etching to form slits.

In the present invention, the above mentioned substrate may be subjected to a surface treatment such as hydrophilicity and hydrophobicity treatments. As other substrate, named are a rubbing plastic film substrate which is prepared by giving a rubbing treatment to the plastic film substrate, various kinds of the above mentioned substrates having a plastic film subjected to a rubbing treatment, for example a rubbing polyimide film, a rubbing polyvinyl alcohol film and the like, and the above mentioned substrates having an oblique vapor deposition film of silicon dioxide.

In the various kinds of substrates, more preferable are a substrate having a rubbed polyimide film, a rubbed polyimide substrate, a rubbed polyetheretherketone substrate, a rubbed polyetherketone substrate, a rubbed polyethersulfone substrate, a rubbed polyphenylenesulfide substrate, a rubbed polyethylene terephthalate substrate, a rubbed polyethylenenaphthalate substrate, a rubbed polyarylate substrate and a rubbed cellulose base plastic substrate.

In the present invention, a liquid crystal material as mentioned above is applied on an alignment substrate as mentioned above and then the liquid crystal material is subjected to a uniform alignment process and a fixation process in the order.

Coating of a liquid crystal material can be conducted with use of a liquid crystal material solution which is prepared by dissolving the material in one of various kinds of solvent or the material in a molten state, but coating of a solution which is prepared by dissolving a liquid crystal material in a solution is preferably used from the view point of a process.

Solution coating will be described.

As solvents, which are to be selected according to a kind of a liquid crystal in use, there can generally be named: halogenated hydrocarbons such as chloroform, dichloromethane, carbon tetrachloride, dichloroethane, tetrachloroethane, trichloroethylene, tetrachloroethylene, chlorobenzene, orthodichlorobenzene; phenols such as phenol, parachlorophenol; aromatic hydrocarbons such as benzene, toluene, xylene, methoxybenzene, 1,2-dimethoxybenzene; acetone, ethylacetate, t-butylalcohol, glycerin, ethyleneglycol, triethyleneglycol, ethyleneglycolmonomethylether, diethyleneglycoldimethylether, triethyleneglycoldimethylether, ethylcellosolve, butylcellosolve, 2-pyrolidone, N-methyl-2-pyrolidone, pyridine, triethylamine, dimethylformamide, dimethylacetoamide, acetonitrile, butyronitrile, carbon disulfide; and a mixture solvent thereof.

A concentration of a solvent is determined by a solubility of a liquid crystal in use and a thickness of a compensating film which is a final product to be obtained and therefore the concentration cannot be defined with certainty, but generally selected in the range of 1 to 60 wt %, or preferably 3 to 40 wt %. If there is no fear that the effect of the present invention is deteriorated, a surfactant may be used as an addict to a solvent for improvement on a coating property of the solution.

As a coating method for an above mentioned liquid crystal solution on an alignment substrate, there can be adopted: a spin coating method, a roll coating method, a printing method, an immersion/pulling method, curtain coating method (a die coating method).

After coating, a solvent is removed and a liquid crystal material layer with a inform thickness is first formed on the substrate. A condition of solvent removal is not specially limited, but there can be employed any conditions where almost all the solvent can be removed and the liquid crystal layer is fluidized nor flow down from the substrate. Generally, a solvent is removed by use of air drying at room temperature, drying on a hot plate, drying in a drying furnace, blowing of warm or hot air.

In stages of coating and drying process steps, an object is to form a uniform liquid crystal layer on a substrate and the liquid crystal layer has not still formed a uniform twist structure therein. In order to align a liquid crystal material, the following heat treatment is applied to the liquid crystal layer.

The heat treatments is carried out at a temperature at which a liquid crystal material shows a chiral discotic nematic phase or higher . That is, alignment is conducted in the chiral discotic nematic phase. Alternately, after the liquid crystal material is temporarily heated to a temperature higher than the range of a temperature where it shows a liquid crystal phase to be transited to an isotropic liquid state, then it is cooled to a temperature at which it shows a chiral discotic nematic phase.

A temperature of the heat treatment cannot be determined with certainty because of dependency on a kind of liquid crystal material, but generally is selected in the range of 50 to 200°, preferably 80 to 170°, or more preferably 100 to 150°, since thermal polymerization in the course of alignment is not preferred if a material having a substituent of polymerization nature is the case.

A time length required on order that a discotic liquid crystal is sufficiently aligned cannot be determined with certainty, but generally is selected in the range of 5 sec to 2 hours, preferably in the range of 10 sec to 40 min or more preferably in the range of 20 sec to 20 min. If it is shorter than 5 sec, there is a fear that insufficient alignment is resulted since a temperature of the liquid crystal layer is not raised to a predetermined temperature. On the other hand, if it is longer than 2 hours, productivity is unfavorably reduced.

In the above methods, a compensating film having a uniform twist structure on an alignment substrate can be obtained. Subsequently, it is preferred that thus obtained film is subjected to a fixation process by photo cross-linkage. While a film thus obtained by a heat treatment can exercise an preferable optical performance, the film is still in a practically insufficient state because there is a risk that an orientational order in the film is disturbed when heated or affected by an external force. Therefore, photo cross-linkage is performed on a film after a heat treatment and thereby a film which is excellent in not only an optical performance but a mechanical strength can be attained. As mentioned above, it is preferred to give a cooling operation to the film before the photo cross-linkage process. If the film is directly subjected to the photo cross-linkage process, the twist structure formed by the heat treatment faces a risk of disturbance since the liquid crystal material immediately after the heat treatment has a fluidity. Therefore, in the present invention, a cooling operation is preferably conducted in order to transit the twisted orientation in a liquid crystal state with a fluidity into a state of no fluidity without any disturbance on the orientation. A liquid crystal material with a columnar and/or a crystalline phase is preferably used in order to reduce a fluidity of the liquid crystal to an great extent with the cooling operation, as mentioned above. In this case, however, there is a fear that the orientation obtained by the heat treatment is destroyed by revelation of these phases with application of an ordinary cooling operation. In such a case as this, if a cooling rate from its liquid crystal state is adjusted to be faster, these phases can be suppressed from occurring. A temperature is usually lowered from a heat treatment atmosphere to a temperature in the vicinity of room temperature and a cooling speed is 100° C./min or more, more preferably 500° C./min or more or still more preferably 1000° C./min or more. A method to achieve such cooling speeds is not specially limited, but there are many choices of: blowing a cold air; being thrown into water; and accelerating a speed of taking out from a heating furnace after the heat treatment. While the cooling is sufficient if the film is cooled to a temperature of the order of room temperature, it is preferred to decrease a temperature lower than a transition temperature to a higher order phase from a chiral discotic nematic phase. The transition temperature indicates a temperature at which a transition from a chiral discotic nematic phase to a higher order phase occurs when a sufficiently low cooling speed is employed. When a monotropic liquid crystal nature is intense and such a measurement is hard to be conducted, the transition temperature indicates a temperature at which a transition from a higher order phase to a chiral discotic nematic phase occurs in the course of temperature raise.

In photo cross-linkage, a wavelength of light to be irradiated is not specially limited and any kind of radiation such as ultraviolet, visible light, infrared (a heat ray) or an electron beam can be used if necessary. Generally, ultraviolet is selected. As a light source therefor, there are named: a low pressure mercury lamp (a germicidal lamp, a fluorescent chemical lamp, a black light), a high pressure discharge lamp (a high pressure mercury lamp, a metal halide lamp), a short arc discharge lamp (extra-high pressure mercury lamp, xenon lamp, mercury xenon lamp). Among them, ultraviolet emitted from a high pressure mercury lamp is most popular and can preferably used. When a proper sensitizer is included in a liquid crystal material or the material itself has a sensitizing function, a light source in the visible light range can naturally be used.

A quantity of light radiated from a light source as mentioned above cannot be determined with certainty because it changes according to a kind of a discotic liquid crystal constituting a liquid crystal material, a composition of the material and an added quantity of an optical initiator, but generally is selected in the range of 20 to 5000 mJ/cm$^2$, preferably 50 to 3000 mJ/cm$^2$ or more preferably 100 to 2000 mJ/cm$^2$.

The film can be used without any treatment further after the photo cross-linkage reaction but an aging process in heating, which is a well known means, maybe conducted in order to complete a reaction of a small residual amount of unreacted polymerizable groups. The aging process is conducted at a temperature usually in the range of 60 to 200° C. or preferably 80 to 160° C. The film after the light irradiation is very small in fluidity and thereby there is little worry that a twist structure is disturbed by an influence of heat.

A compensating film fabricated according to a method as above mentioned may be used as it is or after application of coat with a transparent resin on a surface. If an alignment substrate used for alignment of a discotic liquid crystal lacks a transparency or it has a large birefringence, the alignment substrate may be separated to be removed from the compensating film. The compensating film may be transferred to a different preferable substrate from a view point of an optical performance. Such separation and transfer can be performed by means of a method disclosed in the JP 4-57017 A. method disclosed in the JP 4-57017 A.

A liquid crystal display of the present invention mainly comprises a liquid crystal cell, polarizing plate and an compensating film. In order to obtain a sufficient display performance, optimization in optical parameters and mutual arrangement of constituents is required.

Optical properties and optical parameters of a compensating film will first be described in a relationship with a drive cell.

A proper thickness of a compensating film will first be described. A thickness is required to be controlled in a relationship with a inherent birefringence value which a discotic liquid crystal has. The inherent birefringence (herein after sometimes referred to as Δn) used herein a difference between a refractive index in a direction perpendicular to a director which a discotic liquid crystal used in the compensating film has in a very tiny region (hereinafter referred to as $n_0$)anda refractive index in a direction parallel to the director (hereinafter referred to as $n_e$). The refractive indexes can be measured by use of an Abbe refractometer. Even if a discotic liquid crystal in the compensating film has a structure that a refractive index changes, for example, in a continuous manner, such a refractive index can be measured by utilization of a nature that the Abbe refractometer provide with information on a refractive index in the vicinity of an interface of a film surface. Besides, measurement can be performed on a specimen such that a liquid crystal material is inserted between two substrate with the same interface and directors of all the discotic liquid crystals are oriented along a direction normal to the film. An absolute value of a product between thus obtained birefringence value and a thickness of the compensating film falls generally in the range of 40 nm to 600 m, preferably 80 nm to 400 nm or more preferably 100 nm to 300 nm. If it is less than 40 nm, there is a fear that a viewing field angle characteristics of a liquid crystal display cannot almost be changed. On the other hand, if it is more than 600 nm, there is a fear that unnecessary color is attached to a liquid crystal display.

Figure 2:
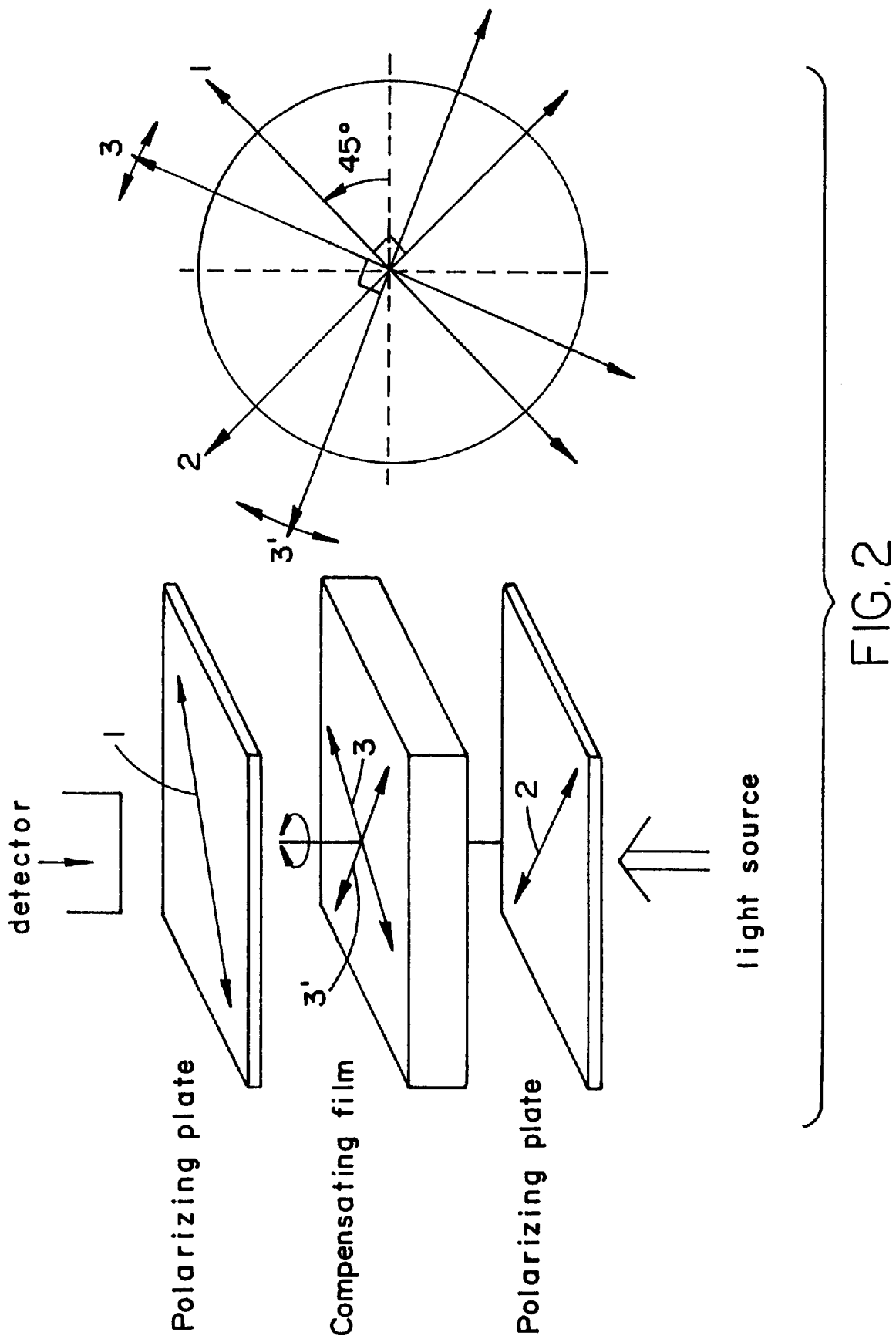
FIG. 2 is representation illustrating a measuring method for a quasi extinction axis of a compensating film employed in the present invention. Left figure is a representation illustrating a structure of a measuring system including a measuring specimen and right figure is a representation illustrating axial directions of the constituent members, wherein a measurement is conducted on a Y value by rotating a compensating film around the normal to the film with a fixed position of a polarizing plate and 1, 2 indicate a transmission axis of the polarizing plate and 3, 3' indicate a quasi extinction axis of the compensating film one of which is a quasi slow axis and the other of which is a quasi fast axis and a minimum of the Y value is obtained when one of the quasi extinction axes 3, 3' coincides with one of the transmission axes 1, 2.

A compensating film used in the present invention has no extinction position in the precise sense of the word which is observed on a general optically anisotropic film. The reason why is that a compensating film used in the present invention has a twist structure and thereby an optical rotating angle and an rotatory dispersion arise. However, in the present invention, a relative positional relation between a liquid crystal cell for drive and a compensating film is important. For this reason, a quasi extinction axis is defined in order to stipulate an orientation in a plane of the compensating film. This is determined in a manner described below. A compensating film is inserted between polarizing plates of a cross-Nicol configuration and the compensating film is rotated in its plane (FIG. 2). In this case, while either of the surfaces of the compensating film maybe at its lower side, the A interface side of FIG. 1(a) is placed at its lower side. If the compensating film is rotated in that arrangement, a minimum of an Y value (a value such that a spectral transmittance or a reflectance is subjected to a visual sensitivity correction (JIS-Z8701)) which is not zero is repeatedly observed almost every 90 degree rotation. In this application a direction which coincides with a transmission axis or absorption axis of the upper polarizing plate or lower polarizing plate in a configuration in which a minimum of the Y value is obtained is defined as a quasi extinction axis of the compensating film. Two extinction axes of the kind are present in the compensating film plane and one is as a slow axis and the other is defined as a fast axis.

Distinction between quasi slow and fast axes is achieved by use of an anisotropic element with a proper retardation value. In a concrete manner, the distinction can be achieved by superposing a direction of a slow axis in a plane of the anisotropic element on one of the two quasi extinction axes of a compensating film so as to coincide with each other. A retardation value of the anisotropic element which is the same as an apparent retardation value in a plane of the compensating film described next is most preferable, but there is no specific limitation. In a more concrete distinction method, an arrangement of the constituents are such that upper and lower polarizing plates are arranged in a cross Nicol's configuration as shown in FIG. 3 and a transmission axis or absorption axis of a polarizing plate forms an angle of 45 degrees to a quasi extinction axis of the compensating film. In this arrangement, if an Y value of the transmissive light is smaller as compared with the case of non-existence of the anisotropic element, it is regarded that a quasi slow axis of the compensating film forms an angle of 90 degrees to a slow axis of the anisotropic element. At this point, it is also regarded that a quasi fast axis of the compensating film has a direction which coincides with a slow axis of the anisotropic element.

An apparent retardation value in a plane which is one of optical parameters of a compensating film will be described. The retardation value can be obtained by means of the following method. In FIG. 3, a quasi slow axis of a compensating film is orthognally crossed with a quasi slow axis of an anisotropic element and an Y value is measured while a retardation value of the anisotropic element is changed in series. As a result of the measurement, an absolute value of a retardation value of the anisotropic element which is obtained as the minimum is adopted as an apparent retardation value in plane of the compensating film. In such a measurement, as an anisotropic element, either a Berek compensator or a Babinet-Soleil compensator whose retardation value can continuously be changed is useful. An apparent retardation value thus obtained in a plane of a compensating film generally falls in the range of 5 nm to 100 nm, preferably 10 nm to 80 nm or more preferably 20 nm to 60 nm.

Here, a quasi extinction axis angle is defined as described below in order to express a direction of a quasi extinction axis of the compensating film in a numeral value. An alignment control force vector, which is defined below, is positioned on the alignment substrate which is used for fabrication of a compensating film and is used as a reference. An angle formed between the alignment control force vector and a quasi fast advance axis vector of the compensating film which is later defined is as a quasi extinction axis angle.

Figure 4A:
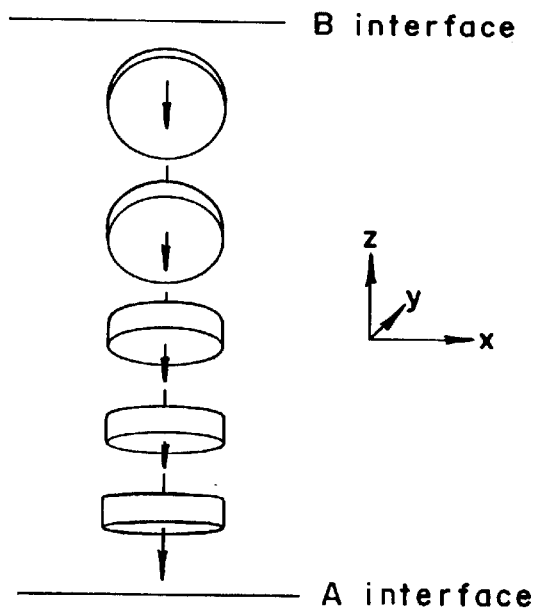
FIGS. 4(*a*) and (*b*) is a view showing, as a model, an orientation of an achiral discotic liquid crystal used for estimation of a direction of alignment control force, wherein in FIG. 4(*a*), an arrow in the figure indicates a director of the discotic liquid crystal, the director is a single headed arrow with a head and tail, discernible from each other, as in FIG. 1(*a*) which head is directed to an A interface side from a B interface side and in an x y z coordinate system used in the figure, the sheet surface including the figure is a z x plane and a direction normal to the sheet surface is a y axis, and in FIG. 4(*b*), is a view showing, as a model, a change along a thickness direction of a projected vector on an x y plane of a director of the discotic liquid crystal and a direction of the projected vector is constant regardless of a position along a thickness direction and the direction of the projected vector is hereinafter called as a vector of an alignment control force.
Figure 4B:
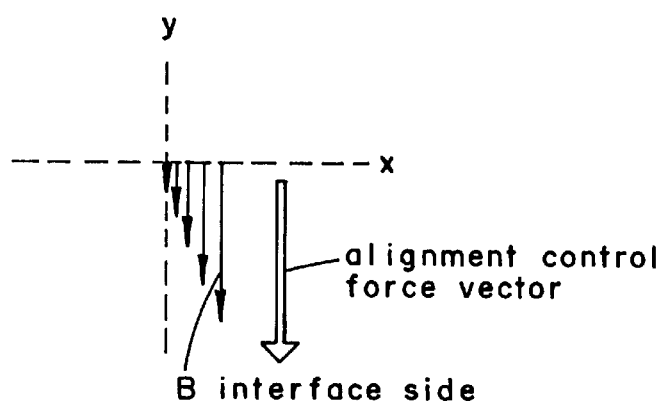

An alignment control force vector in the present application assumes a direction of a fast axis arising in a plane when a discotic liquid crystal is aligned such that a inclination of a director changes along a thickness direction without any revelation of a twist structure on the alignment substrate (FIG. 4(a)). In concrete manner, when a projected vector of a director of a discotic liquid crystal in a orientational order of FIG. 4 is obtained on the film plane, the projected vector is obtained as a projected vector assuming one direction regardless of a position along a thickness direction. This direction is that of the alignment control force vector (here, a magnitude of the vector is not discussed). In a liquid crystal material having a chiral discotic nematic phase as mentioned above, as a discotic liquid crystal which does not reveal a twist structure, there can be used a discotic liquid crystal material, in which a chiral unit is replaced with a corresponding racemic unit or a proper different chiral unit. An alignment control force vector is mainly dependent on a surface state of the alignment substrate and an influence of a kind of liquid crystal on the vector is small. Therefore, a liquid crystal used in measurement on an alignment control force vector is not specifically limited. When an alignment control force is conferred to an alignment substrate by means of a rubbing treatment, an alignment control force vector and a rubbing direction usually almost coincide with each other in direction.

A quasi fast axis vector in the present invention is a vector obtained by conferring a distinction between a tail and head for a matter of convenience to the above mentioned quasi fast axis (a magnitude of the vector is not discussed). A direction of a projected vector on a film plane of a director of the discotic liquid crystal monotonously changes with an alignment control force vector (which is usually in the A interface) as a start, as shown in FIGS. 1(a) and (b). Any arbitrary director in the film resides between the alignment control force vector and a projected vector in the B interface in regard of a direction. A quasi fast axis vector of the compensating film is also directed such that the direction of the quasi fast axis vector resides between directions of the alignment control force vector and a projected vector in the B interface in a similar manner. For example, In FIG. 1(b), the quasi fast axis vector is a vector which is directed from the origin to the third quadrant since head points of all the projected vectors of directors reside within the third quadrant (a space between 180 degrees and 270 degrees in angle to X axis).

A direction of the quasi fast axis vector can be discerned by a different method. While a chiral unit is included in a liquid crystal material used for fabrication of a compensating film, a liquid crystal material which includes less of a chiral unit is prepared separately as compared with a liquid crystal material to be used. Since decrease in quantity of a chiral unit reduces a twist, a quasi fast axis vector gradually approaches closer to an alignment control force vector. In the extremity where a quantity of a chiral unit is zero, the fast axis vector perfectly coincides with the alignment control force vector. If a direction of a quasi fast axis vector is determined such that the determination is not inconsistent with the above description, a direction of the quasi fast axis vector can be discerned.

An angle formed between a quasi fast axis vector as defined above and an alignment control force vector is a quasi extinction axis angle defined in the present invention. When a film is viewed from the B interface side of FIG. 1(a) and a projected vector in the B interface is rotated toward the alignment control force vector in the A interface over the quasi fast axis vector, if a rotational direction is counterclockwise, a sign of a quasi extinction angle assumes plus and a twist structure is expressed as left twist. If a rotational direction is clockwise, a sign of a quasi extinction angle assumes minus and a twist structure is expressed as right twist. FIGS. 1(a) and (b) are an example of left twist.

An absolute value of a quasi extinction axis angle thus obtained generally falls in the range 5 to 90 degrees, preferably 10 to 75 degrees or more preferably 15 to 45 degrees. If it is less than 5 degrees, there is a fear that only insufficient compensation performance can be obtained as in the case of non-existence of a twist structure. On the other hand, if it is larger than 90 degrees, there is also a fear that a contrast ratio on a front of a display device is reduced. A sign of a quasi extinction axis angle of an compensating film is preferably plus for a drive cell with right twist and it is preferably minus for a drive cell with left twist.

An optical rotating angle which is the most greatest feature of a compensating film used in the present invention will be described. A compensating film used in the present invention has an optical rotating power and an apparent optical rotating angle. The rotating angle is defined as a value obtained by the following method. As compensating film is inserted between two polarizing plates. In this case, the polarizing plates are in a cross-Nicol's configuration. The compensating film is disposed such that a quasi extinction axis thereof as mentioned above is positioned in parallel to or crosses orthoganally a transmission axis of a polarizing plate. In such an arrangement, taking the arrangement of the polarizing plates as a reference, only the upper polarizing plate is rotated so as to have an Y value of transmissive light minimized. In the present invention, a rotational angle of the upper polarizing plate which is angularly displaced from a cross -Nicol's condition is defined as an apparent optically rotating angle. Generally, in the case where no twist structure exists, transmissive light is almost nothing under a cross-Nicol's condition. Therefore, This angular displacement is considered to be caused by rotation of a polarizing plane by a twisted orientation structure which a discotic liquid crystal forms. In the range of an optical parameter of the compensating film, a rotatory dispersion arises together with the optically rotating power. Therefore, an optically rotating power used in the present invention is not one which rotates a plane of vibration in an equal manner for all the wavelengths of light. Even for an arrangement of polarizing plates which gives the minimal Y value, the value is not zero. A liquid crystal cell for drive in a black display also has such optically rotating angle and rotatory dispersion and therefore light leakage arises, which is a cause for reduction in contrast ratio of a display. If this is a phenomenon that a polarizing plane is rotated for all the wavelengths of light in an equal manner, such light leakage can be avoided by adjusting alignment angles of constituents such as polarizing plates or the like, but a rotatory dispersion can not be avoided so as to be free from the influence by only changes in angles between constituents. An optical rotating dispersion which a liquid crystal has at the time of a black display can be offset by only a compensating film having a twist orientational structure and a viewing angle characteristics of a liquid crystal for drive can be improved by the compensating film as well. An optical rotating angle of a compensating film used in the present invention is used for a representative of characteristics regarding an optical rotating power of the film since there is a correlation between an optical rotating angle and an rotatory dispersion.

The optical rotating angle assumes a plus sign if an upper polarizing plate is rotated counterclockwise from a reference position when viewed from the light source in FIG. 2 (when viewed upwardly from the bottom in FIG. 2). If rotated clockwise, the rotating angle assumes a minus sign. It is preferred that a sign of an optical rotating angle of a compensating film used in the present invention is contrary to that of an extinction axis angle as mentioned above. While a film in which a product between a thickness and a birefringence as mentioned above is still larger than the preferred range and in addition to this an absolute value of ar extinction axis angle is smaller than the preferred range has a chance where signs of the optical rotating angle and extinction axis angle are the same (a waveguide effect), use of such a film in the present invention is not preferable. In the vicinity of the A interface in FIG. 1($a$), that is, in a portion in which an angle between a film plane and a director is large, a twist structure contributes to increase in an extinction axis angle, but the structure does not contribute to an optical rotating power so much. Therefore, in a film, if a structure which is as observed in the vicinity of the A interface is dominant when an orientational structure along a thickness direction is globally viewed, a optical rotating angle observed is small. If a compensating film with an extremely small optical rotating angle is used, there is a risk that a conspicuous compensating effect as in the present invention cannot be obtained, even though an extinction axis angle of the film has an significant value or the film has a clear twist structure.

An apparent optical rotating angle of a compensating film preferably used in the present invention generally falls in the range of 0.5 to 10 degrees, preferably 1 to 7 degrees or more preferably 1.5 to 5 degrees. If it is smaller than 0.5 degree, an effect of a twist cannot be attained. On the other hand, if it is lager than 10 degrees, there is a fear that an adverse influence of a twist exercises on a viewing angle compensating effect since an influence of a twist is too large. A sign of the optical rotating angle of a compensating film is contrary to that of an optical rotating angle measured on a liquid crystal cell for drive at the time of a black display. Measurement on an optical rotating angle is conducted by inserting the liquid crystal cell in a black display between polarizing plates with a cross-Nikol's configuration in a similar manner to measurement on a compensating film. In this case, a transmission axis of the lower polarizing plate and an easy axis of the lower electrode of a cell are set parallel to each other Then, the upper polarizing plate is rotated to find a position at which an Y value of transmissive light shows the minimum. In this arrangement, a rotational angle of the upper polarizing plate as viewed from the light source is measured as an optical rotating angle of the liquid crystal cell for drive. The most preferable combination of a liquid crystal and compensating film is summarized in Table 1.

TABLE 1

| twist of drive cell | optical rotating angle in a black display | extinction axis angle of compensating film | optical rotating angle of compensating film |
| --- | --- | --- | --- |
| right | plus | plus | minus |
| left | minus | minus | plus |

Arrangement of a liquid crystal cell, a compensating film and polarizing plates will be described.

One or a plurality of or preferably one or two compensating films are used for one liquid crystal cell for drive. Especially, it is most preferable to use two compensating films. While it is desirable to use one compensating film in an aspect of cost, it is desirable to use two in terms of a display characteristic. If three or more are used, it is not realistic in an aspect of cost. A compensating film is set so as to be sandwiched by a liquid crystal cell and polarizing plates.

Figure 5:
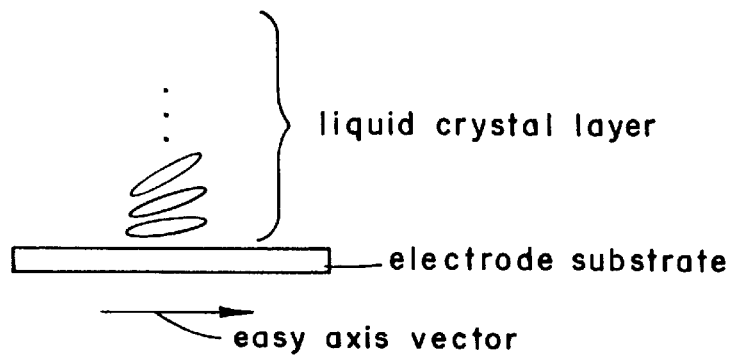
FIG. 5 is a representation illustrating an easy axis of an electrode substrate for a liquid crystal cell for drive, wherein an easy axis vector is defined in order to describe a direction along which a pretilt is induced.

The case where one compensating film of the present invention is used will be described. A compensating film is placed between the liquid crystal cell for drive and the upper polarizing plate or the lower compensating plate. A quasi fast axis of the compensating film and an easy axis direction of an electrode substrate of the liquid crystal cell for drive closer to the compensating film are preferably optimized. A direction of the easy axis of the liquid crystal cell is defined as a vector. The easy axis is a direction projected on the substrate of a molecular director of a liquid crystal at the electrode substrate interface. A director of a nematic liquid crystal in the liquid crystal cell for drive has no distinction between a front end and a rear thereof as in the case of a discotic liquid crystal. However, as a matter of convenience, it is necessary to confer the director a distinction of a front and rear for a protected vector of a director because of occurrence of a tilt. For that reason, an arrow is drawn as a line which is directed from a lower end to a rising end of a tilted liquid crystal molecule as shown in FIG. 5 and the vector is defined as an easy axis vector (a magnitude of a vector is not discussed). A direction of the vector usually corresponds to a rubbing direction when the substrate for a liquid crystal cell for drive is subjected to a rubbing treatment.

It is preferred that an angle formed between the easy axis vector of the electrode substrate which is nearer to the film and the quasi fast axis of the film generally falls in the range of −30 to +30 or +150 to +210degrees. As to a sign, when observed in such a manner that a quasi fast axis vector is present in the nearer side and an easy axis vector is present in the farther side (when a compensating film is inserted on the upper side of the cell, observed from the upper polarizing plate side) downwardly, if the easy axis vector is rotated counterclockwise and thereby can be superimposed on the quasi fast axis vector, the angle is defined as plus.

When the A interface side of FIG. 1 is arranged such that it abuts on an electrode substrate of the liquid crystal cell for drive, the arrangement is preferred such that an angle formed between the easy axis angle of the liquid crystal cell and the quasi fast axis vector of the compensating film generally falls in the range of −30 to +30 degrees, preferably −25 to +25 degrees or more preferably −20 to +20 degrees. If the angle is not in the range of −30 to +30 degrees, there is a risk that not only is an effect of a viewing compensation insufficient but reduction in contrast of a liquid crystal display is resulted, which is not preferred.

When the B interface side is arranged such that it abuts on the electrode substrate of the liquid crystal cell for drive, the arrangement is preferred such that an angle formed between the easy axis vector of the liquid crystal cell for drive and the quasi fast axis vector of the compensating film generally falls in the range of +150 to +210, preferably +155 to +205 degrees or more preferably +160 to +200 degrees. If the angle is not in the range of +150 to +210 degrees, there is a risk that not only is a effect of a viewing angle compensation insufficient but reduction in contrast of a liquid crystal display is resulted, which is not preferred.

The case where two compensating films are used will be described. The two compensating films are respectively inserted on the upper side and lower side of the liquid crystal cell for cell or the two films are inserted in a layered structure either on the upper side or lower side of the liquid crystal cell for cell.

When the films are inserted in a separate manner on the upper side and lower side, conditions applied to the above mentioned case are applied to each film without any change. The films, upper and lower, may be arranged such that both films abuts on the electrode substrate by each A interface side or both films abuts on the electrode substrate by each B interface side. The latter case is more preferable where both films abuts on the electrode substrate by each B interface side. A limitation to an angle formed between the easy axis vector of the liquid crystal cell for drive and the quasi fast axis vector of one compensating film, which has been described above, can be applied to each of the upper and lower films, but it is preferred that the angles of both films are almost equal. That is, it is preferable that an angle formed between the easy axis vector of the upper electrode substrate and the quasi fast axis of the upper compensating film is equal to an angle formed between the easy axis vector of the lower electrode substrate and the quasi fast axis of the lower compensating film.

When two compensating films are used as a layered structure, an expansion effect of a viewing angle are almost equal to that of the case where the films are separately inserted in the two positions, upper and lower. A method of arrangement of the two films is as follows: First, the two films are separately inserted in the two positions, upper and lower, according to the optimal arrangement as mentioned above. Then, a film located in the lower side is moved into between the upper polarizing plate and upper compensating film without any rotation in a film plane and turning upside down. Thus obtained arrangement is the optimal one when the two film in a layered structure is used. It is needless to say that the case where two layered compensating films are on the lower side of the liquid crystal cell for drive is also preferred in the same extent.

The most preferable case of the arrangements as mentioned above is the case where the two compensating film are respectively placed on the upper and lower sides of the liquid crystal cell for drive and the B interface side of each film (FIG. 1) abuts on one of the electrode substrates of the liquid crystal cell for drive. This arrangement will in a more detailed manner be described. It is preferred, as mentioned above, that an angle formed between an easy axis vector of the upper(lower) electrode substrate and a quasi fast axis vector of an compensating film falls within ±30 degrees of +180 degrees. If the upper(lower) arrangement is such that the angle falls in a more restricted range, an effect of the twist structure can be exercised at a higher level. That is, it is preferred that the angle when a liquid crystal cell for drive with right twist is used falls preferably in the range of +150 to +179.5 degrees, more preferably +155 to +179 degrees or particularly preferably +160 to +178 degrees. It is preferred when a liquid crystal cell for drive with left twist is used falls preferably in the range of +180.5 to +210 degrees, more preferably +181 to +205 degrees or particularly preferably +182 to +200 degrees. Here, a definition of a sign is as mentioned above and a plus sign is attached if an easy axis vector is rotated counterclockwise and the easy axis vector can thereby coincide with the quasi fast axis vector in direction when observed in such a manner that a quasi fast axis vector is located in the nearer side and an easy axis vector is located in the farther side. In this case, it is needless to say that a twist direction of a compensating film (a sign of a quasi extinction axis angle and a sign of an optical rotating angle) is selected based on a twist direction of the liquid crystal cell for drive as mentioned above. In such a manner, it is preferable that an easy axis vector and a quasi fast phase axis vector are not perfectly parallel to each other, though senses of the directions are contrary to each other (wherein the angle is +180 degrees), that is, an angle which is shifted from +180 degrees to the minus direction is selected for a liquid crystal cell for drive with right twist, while an angle which is shifted from +180 degrees to the plus direction is selected for a liquid crystal cell for drive with left twist. The reason why will be explained. It is essentially preferred that an arrangement of an compensating film with a twist orientational structure is determined in reference to a relation between a projected vector on a film plane of a director in the B interface (FIGS. 1(a) and (b)) and an easy axis vector rather than in reference to a relation between a quasi fast axis vector and an easy axis vector. The reason why is that the easy axis vector indicates an alignment direction of molecules of a liquid crystal at the substrate interface of the liquid crystal cell for drive and therefore, a vector of a compensating film corresponding to this is not in the precise sense a quasi fast axis vector but a projected vector of a director on the B interface. However, since it is difficult to measure a direction of the projected vector precisely, the optimal arrangement in a liquid crystal display device using a compensating film is determined based on a quasi fast axis vector in the present invention as has been mentioned above.

When the B interface of a compensating film and an electrode substrate of a liquid crystal cell for drive mutually abuts on each other, it is preferred that a projected vector on a film plane of a director of a discotic liquid crystal at the B interface and an easy axis vector are in a relation such that the vectors are approximately parallel to each other with opposed senses. As mentioned on FIGS. 1(a) and (b), a quasi fast axis vector is located between a projected vector in the B interface and an alignment control force vector in the A interface in terms of direction. For that reason, when an easy axis vector of a liquid crystal cell for drive and a projected vector on the B interface are parallel to each other with opposed senses, the easy axis vector of a liquid crystal cell for drive and a quasi fast axis vector of a compensating film lose a parallel relation to each other with opposed senses. For such a reason mentioned above, it is preferred that the easy axis vector of a liquid crystal cell for drive and the quasi fast axis vector of a compensating film do not have a perfect parallel relation to each other with opposed senses and both vectors are located in an angularly displaced manner so as to assume determined directions (toward a minus direction for a liquid crystal cell for drive with right twist or toward a plus direction for a liquid crystal cell for drive with left twist) When an angle formed between an easy axis vector of the liquid crystal cell and a quasi fast axis vector of the compensating film is just +180 degrees and when a displacement direction from the +180 degrees is contrary to that as mentioned above, that is when a liquid crystal cell with right twist is used and the angle is in excess of +180 degrees and when a liquid crystal cell with left twist and the angle is less than +180 degrees, a large effect of viewing angle compensation can still be enjoyed as compared with a film without any twist orientational structure if the angle falls within ±30 degrees of +180 degrees.

A liquid crystal cell for drive of a twisted nematic type used in the present invention has a twist angle of a liquid crystal in the cell in the range of 70 to 110 degrees or preferably about 90 degrees. A direction of twist of the liquid crystal cell may be of either of right and left twists, but in the present invention, as mentioned above, a twist direction of a compensating film is required to be selected on the basis of the twist direction of the liquid crystal. A retardation when a voltage is not applied to the liquid crystal cell generally falls in the range of 200 nm to 1200 nm, preferably 300 nm to 600 nm or more preferably 400 nm to 550 nm. Besides, as a drive method of a liquid crystal cell, a simple matrix type or an active matrix type using a TFT (Thin Film Transistor) electrode or an MIM (Metal Insulator Metal) electrode can be selected. In the present invention, there can be obtained a liquid crystal device which has a wide viewing angle by optimization of a compensating film and optimization of arrangement of the compensating film and a liquid crystal cell regardless of a difference in drive methods. However, since a difference in orientation of a liquid crystal in a liquid crystal cell for drive arises according to a drive method or a drive condition, a compensating film suitable for a liquid crystal cell is required to be selected depending on a situation.

Lastly a polarizing plate will be described. Two polarizing plates are used as a pair and respectively arranged at upper and lower positions such that a liquid crystal cell for drive and one or a plurality of compensating films interpose therebetween. Since a liquid crystal device of the present invention is driven in a normally white mode, transmission axes of the two polarizing plates are arranged to intersect each other orthogonally. Orthogonal intersection used here includes the cases where an angular displacement from 90 degrees of an angle formed between two transmission axis is 10 degrees or less, preferably 6 degrees or less or more preferably 4 degrees or less in an absolute value.

A relation between a transmission axis of a polarizing plate and an easy axis of a liquid crystal cell for drive is not especially restrictive. When a spatial relation between a transmission axis of a polarizing plate and an easy axis of a liquid crystal cell (a transmission axis of an upper polarizing plate and an easy axis on an upper side of the cell substrate, or a transmission axis of a lower polarizing plate and an easy axis on the lower side of the cell substrate and an easy axis of a lower cell substrate) which are located in a closely adjacent manner to each other is such that both axes are in approximate parallel relation to each other, a mode of this case corresponds to an extraordinary light mode. When both axes intersect orthogonally, a mode of this case corresponds to an ordinary light mode and when both axes has a relation that both do not intersect orthogonally, nor are parallel to each other, a mode of this case corresponds to a birefringence mode. A shape of a contrast curve is different according to differences in mode, and therefore a direction of a transmission axis should be selected such that preferable visual field characteristics can be obtained for a particular object of a display.

Examples will be described below and it should be understood that the present invention is not limited to the examples. Analytical methods used in the examples are as follows:

Determination of a Chemical Structure:

Chemical structures of a chemical compound and a composition constituting a liquid crystal material were determined by measuring $^1$H-NMR spectrum at 400 MHz (JNM-GX400 made by Nihon Denshi Co.)

Observation by Optical Microscope

A polarization microscope BX-50 made by Olympus Optical Co., Ltd was used to observe a texture while heating on a Mettler's hot stage (FP-80). Berek compensator (U-CBE) made by Olympus Optical Co., Ltd was mounted to the body of the microscope to measure an extinction axis and a retardation.

Polarization Analysis

A elipsometer DVA-36VWLD made by K. K. Mizonojiri Kogaku was used.

Measurement on Refractive Index

An Abbe refractometer Type-4T made by Atago K. K. was used.

Thickness Measurement

A high precision thin film step measuring instrument ET-10 made by K. K. Kosaka Kenkyujo was mainly used.

In addition, used was a method of determining a thickness from measured data of optical interference (an ultraviolet/visible/near-infrared spectrophotometer V-570 made by Nihon Bunko K. K.) and measured data of a refractive index.

Chemical formula (1)

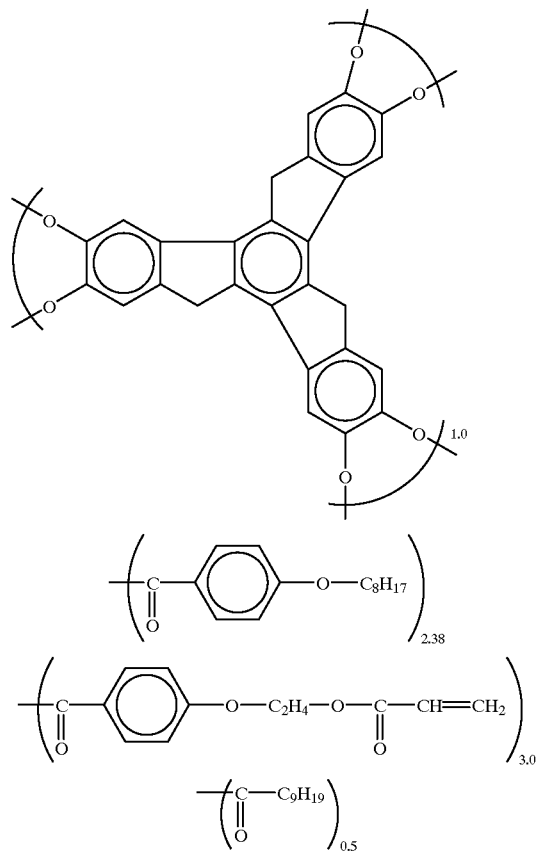

-continued

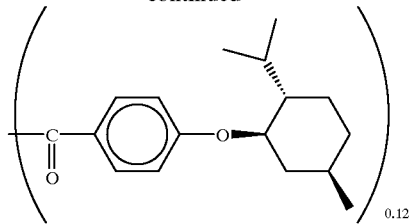

, wherein a figure in parentheses indicates a mol compositional ratio and menthyloxybenzoic acid was obtained from (1R, 2S, 5R)-(-)-menthol.

EXAMPLE 1

A liquid crystal material of the chemical formula (1) was prepared. The material of the chemical formula (1) includes an optically active menthyloxybenzoic acid unit and this compound was prepared from (1R, 2S, 5R)-(-)-menthol. The liquid crystal material of the chemical formula (1) assumed a chiral discotic nematic phase at a temperature of 65° C. or higher, whereas a columnar phase of the material was stable at a temperature in the range of room temperature to 65° C. While the chiral discotic nematic phase was at least present up to 170° C., a transition temperature to an isotropic phase was unable to be confirmed because thermal polymerization occurred.

10 g of the liquid crystal material was added with 0.4 g an optical initiator Irgacure 907 (made by CIBA-GEIGY Co.) and 40 g of triethyleneglycoldimethylether was further added to form a coating solution. This solution was applied on a glass substrate 10 cm square having a polyimide receiving a rubbing treatment to form a coat by a spin coat method. The coat was dried on a hot plate of 80° C., followed by a heat treatment at 140° C. in an oven for 10 min. The substrate with the coat was taken out into the atmosphere of room temperature for cooling and after the cooling, the coat was exposed to light irradiation with use of a high pressure mercury lamp at room temperature to obtain an photo-polymerized film 1, wherein an exposure dose was 600 mJ/cm². Optical properties of the film 1 were as shown in Table 2. The film had a larger angle formed between a director and a film plane at the surface abutting on the substrate (the A interface side of FIG. 1) and had a smaller angle formed between a director and a film plane at the surface exposed to the air (the B interface side of FIG. 1). Optical properties of the film are shown in Table 2. A direction of an alignment control force vector was optically measured on a film 1' obtained in a similar manner to the above mentioned from an achiral discotic liquid crystal (a compound expressed by the formula (1) in which menthyloxybenzoic acid unit is a racemic modification) corresponding to the formula (1) separately synthesized. An alignment control force vector present on the A interface side of the film 1' had a direction perfectly coinciding with a rubbing direction of a cloth piece in a rubbing treatment of the substrate. A refractive index was measured on the film 1' and thus obtained value was adopted as an inherent birefringence value of the liquid crystal material of the formula (1).

Two films 1 were used and they were placed on a liquid crystal cell for drive of a TN type in the arrangement of FIG. 6 to measure a dependence of a contrast ratio on a viewing angle. The film 1 employed is a film formed on a glass substrate having a polyimide film receiving a rubbing treatment as used as an alignment substrate. A liquid crystal cell of a TN type for drive was fabricated in the following manner. Two borosilicate glass plates each 10 cm square and 1.1 mm thick having an ITO film were first prepared, a polyimide film was formed on each glass substrate and rubbing was applied to the surface of the polyimide film to prepare electrode substrates for a cell. A liquid crystal ZLI-4792 of a low molecular weight made by Merk Co. was inserted between the two electrode substrates thus obtained to fabricate a liquid crystal of a TN type for drive. Under no application of a voltage thereon, thus obtained liquid crystal cell assumes a left twist structure at a twist angle of 90 degrees and a retardation of 490 nm for a wavelength of 500 nm of light. A drive voltage was set as 6.2 V for a black display and as 1.0 V for a non-selection condition (white display). An optical rotating angle of a liquid crystal of the liquid crystal cell was -1.0 degree.

As a result, it has been found that there can be obtained a display with a wider viewing angle as compared with the case of non-existence of the film 1.

EXAMPLE 2

Viewing angle characteristics were measured in configurations of FIGS. 8(a) and (b) such that directions of transmission axes of the upper and lower polarizing plates were respectively rotated by 90 degrees with respect to Example 1. While FIGS. 6(a), (b), (c) and (d) of Example 1 were all in an ordinary ray mode, an extraordinary ray mode was employed here. As a TN type liquid crystal cell for drive, the cell used in Example 1 was used in the same drive condition as that of Example 1. As a result, obtained was a display with a wider viewing angle as shown in FIGS. 9(a) and (b), as compared with the case of non-existence of the compensating plate, that is the film 1.

EXAMPLE 3

Viewing characteristics were measured in configurations of FIGS. 10(a)–(d) such that directions of transmission axes of the upper and lower polarizing plates were respectively rotated by 45 degrees with respect to Example 1. While Examples 1 and 2 were all in an optical rotating mode without a film 1, an birefringence mode was employed here. As a TN type liquid crystal cell for drive, the cell used in Example 1 was used in the same drive condition as that of Example 1. As a result, obtained was a display with a wider viewing angle as shown in FIGS. 11(a) and (b). While a viewing angle is especially larger in oblique directions in Examples 1 and 2, in this example, an especially wider viewing angle was able to be attained in upper and lower, and left and right sides of the figures. When an 8-level gradation display was effected at selected voltages between drive voltages of 1.0 V and 6.2 V with a constant difference between adjacent selections, a non-inversion range of gradation of a viewing field angle was wider as compared to Examples 1 and 2.

EXAMPLE 4

Chemical formulae (2) (a)

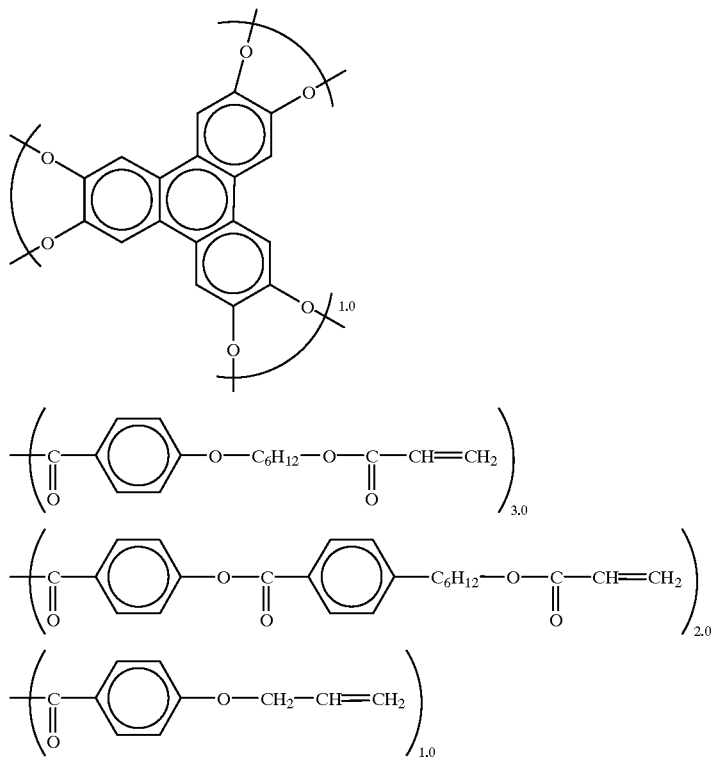

, wherein a figure in parentheses indicates a mole compositional ratio.

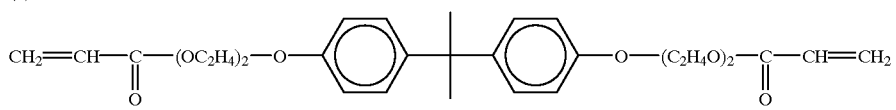

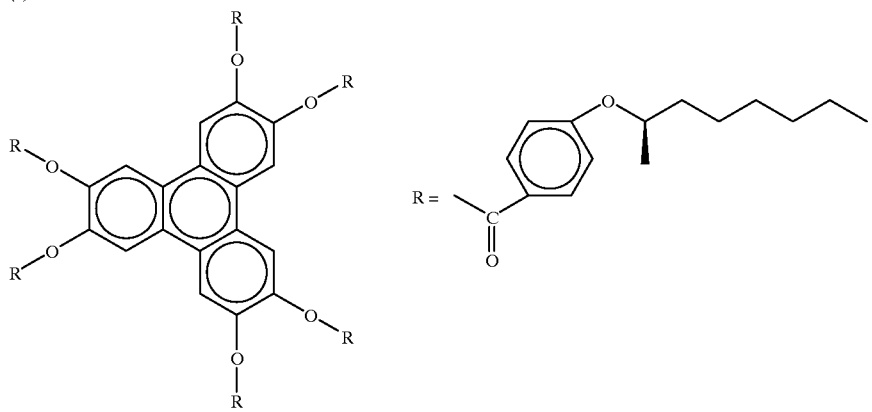

A liquid crystal material made of the chemical formulae (2)a, b and c was prepared. Compositional ratios of a:b:c were selected as 70:20:10 by weight. The chemical formula (2)a is a discotic liquid crystal having an acrylic group, the chemical formula (2)b is a polymerizable compound without a liquid crystal nature and the chemical formula (2)c is a chiral discotic nematic liquid crystal having an optically active substituent derived from (R)-2-octanol. This liquid crystal material showed at least a chiral discotic nematic phase at a temperature in the range of 70 to 180° C. When a temperature was gradually lowered from a temperature in the range of a chiral discotic nematic phase, deposition of a microcrystalline structure was observed at 55° C. When a temperature was raised from a state in which microcrystals were present, a phase was transited to a chiral discotic nematic phase at 70° C. As an optical initiator, 2.0 wt % of Bi-imidazole (made by Kurogane Kasei k. k.) and as a sensitizer, 0.5 wt % of Michler's ketone were added to the liquid crystal material in percentage of the total weight thereof. The liquid crystal material was dissolved in butylcellosolve to prepare a 15 wt % solution.

A film was fabricated in a continuous process using the solution. The solution was applied on a rubbing polyimide film 40 cm wide (a capton film 100 μm thick made by Dupont Co. treated by rubbing) over a 20 m length by a role coater, the coat was dried by a hot air of 80° C., then subjected to a heat treatment at 120° C. and thereafter it was cooled. Subsequently, the film was exposed to light irradiation from a high pressure mercury lamp in order to perfectly fix an orientational order of a discotic liquid crystal. The exposure dose was 400 mJ/cm$^2$ and a temperature of a specimen room in which an irradiation apparatus was installed was about 40° C. Thus, a film 2 was able to be obtained formed on rubbed polyimide.

Since the polyimide film lacked transparency and it was problematic to use the film 2 as is according to a kind of application, the film 2 was transferred on an optical grade triacetylcellulose film 80 μm thick (made by Fuji Photo Film Co., Ltd.) with an ultraviolet curing type adhesive interposing therebetween. This operation comprised the steps of: applying the ultraviolet curing type adhesive on the surface of the film 2 by a roll coat method; laminating a triacetylcellulose film thereon; then irradiating ultraviolet from a high pressure mercury lamp on the film to cure the adhesive; and separating the rubbed polyimide film off from the film 2.

An optical measurement was conducted on the film 2 placed on the triacetylcellulose film after the separation/transfer operation and values of optical properties thereof were obtained as in Table 2.

The film 2 had a large angle formed between a director and a film plane at the interface with the rubbed polyimide film, that is the interface with the air after the separation/transfer operation (the A interface side of FIG. 1(a)) and had a smaller angle formed between a director and a film plane at the interface with the air before the separation, that is the interface with the adhesive layer after the separation/transfer (the B interface of FIG. 1(a) A vector of an alignment control force in the A interface side coincided with the direction of rubbing given to the polyimide film.

Dependence of a contrast ratio on a viewing angle was measured with use of the film 2 placed on a liquid crystal cell of a TN type for drive in the arrangement of FIG. 12. The film 2 was used as a compensating plate in the form that the film 2 is formed on a triacetylcellulose. The liquid crystal cell was prepared such that a liquid crystal ZLI-3651 of a low molecular weight made by Merck Co., Inc. was sandwiched by electrode substrates each having a rubbed polyimide film. A liquid crystal in the liquid crystal cell for drive had a left twist structure by 90 degrees and a retardation under no application of a voltage was 440 nm. A drive was set at 5.2 V for a selection condition (a black display) and at 1.0 V for a non-selection condition (a white display). An optical rotating angle at 5.2 V was −3.0 degrees. As a result, obtained was a display whose viewing angle is wider than in the case of non-existence of a compensating plate, that is the film 2, as shown in FIG. 13.

EXAMPLE 5

A thin film 3 having a smaller thickness than the film 2 was fabricated in a similar manner to Example 4. Optical properties of the film 3 are shown in Table 2. Two films 3 were used and respectively placed on the upper and the lower surfaces of a liquid crystal cell for drive as shown in FIG. 14 and dependence of a contrast ratio on a viewing angle was measured. Each of the films 3 was used in the form that the film is formed on a triacetylcellulose film as a compensating plate as in the above example. The liquid crystal cell which had been used in Example 1 was used in this example. As a result, a display having a wide viewing angle was attained as shown in FIG. 15. A viewing angle was wider as compared with FIG. 13 of Example 4 and a symmetry between left and right halves of an iso-contrast curve in the figure was better than FIG. 13.

EXAMPLE 6

Chemical formulae (3)

(a)

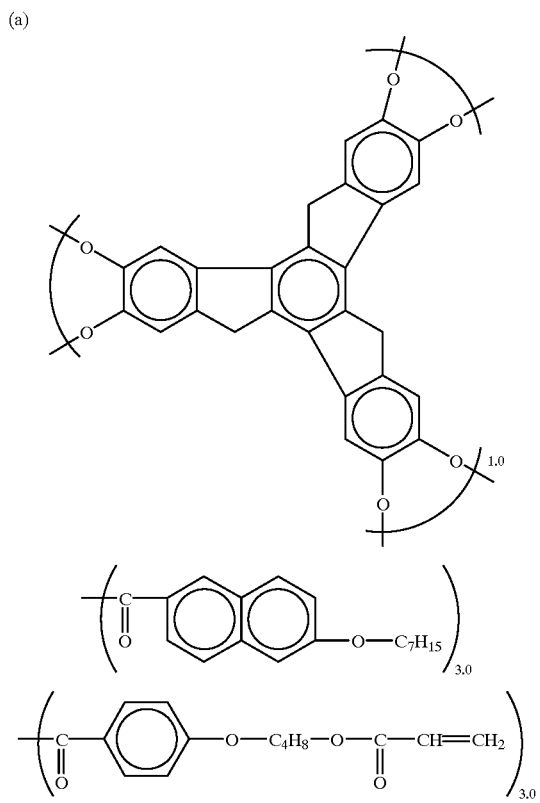

-continued (b)

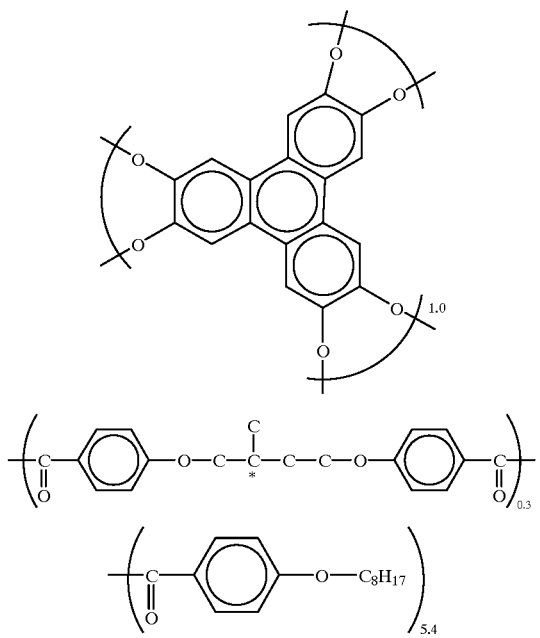

, wherein a figure in parentheses indicates a mole compositional ratio and * indicates an asymmetric carbon.

Compounds expressed by the chemical formulae (3)a and b were synthesized. A chiral unit in the formula (3)b was prepared from S-2-methylbutanediol as a raw material. A composition such that a and b in the formulae 3a and b were mixed in a ratio of 94.2:5.8 in weight was used as a liquid crystal material. Ten g of the material was added with 0.1 g of a photo initiator Irgacure 184 (made by CIBA-GEIGY Co.) and 40 g of methylethyl ketone was further added, whereby a coating solution was prepared. As an alignment substrate, a triacetylcellulose film having a polyvinyl alcohol (Kuraray Poval MP-203 made by Kuraray Co., Ltd.) film receiving a rubbing treatment was used. Such a substrate was prepared by applying an aqueous solution of polyvinyl alcohol on a surface of a triacetylcellulose film; drying the substrate to form a film thereon; and giving the film a rubbing treatment.

The liquid crystal material solution was applied on an alignment substrate to form a coat by means of a spin coat method. Then the coat was dried and then subjected to a heat treatment at 130° C. to align the liquid crystal material and after the alignment, the coat was exposed to light irradiation from a high pressure mercury lamp to perfectly fix an orientational order in a discotic liquid crystal. The optical irradiation was carried out in the air atmosphere at 80° C. with a dose of exposure of 600 mJ/cm². Physical properties of a film 4 thus obtained are shown in Table 2. The A interface side in FIG. 1 of the film 4 was present at the interface of the side abutting on the rubbed polyvinyl alcohol film. A direction of an alignment control force vector on the interface perfectly coincided with the rubbing direction of the polyvinylalcohol film.

Two films 4 which were formed on the triacetylcellulose film substrate having a rubbed polyvinylalcohol film were used each as a compensating plate, the two films 4 were placed on a liquid crystal cell of a TN type for drive in the arrangement shown in FIG. 16(a) and dependence of a contrast ratio on a viewing angle was measured. The liquid crystal cell was prepared by inserting a liquid crystal of a low molecular weight ZLI 4172 made by Merck Co., Inc. between electrode substrates each having a rubbed polyimide film. A liquid crystal in the cell had a left twist by 90 degrees and a retardation of 500 nm under no application of a voltage. Drive was set at 5.8 V for a section condition (a black display) and at 1.1 V for a non-selection condition (a white display). An optical rotating angle of the liquid crystal at 5.8 V was −4.0 degrees. As a result, a display having a wide viewing angle was obtained as shown in FIG. 17.

EXAMPLE 7

A composition such that a and b in the formulae 3a and b were mixed in a ratio of 95.5:4.5 in weight was used as a liquid crystal material. Ten g of the material was added with 0.1 g of an optical initiator Irgacure 184 (made by CIBA-GEIGY Co.) and 40 g of methylketone was further added, whereby a coating solution was prepared. That is, prepared was a solution whose compositional ratios of the formulae (3)a and b are different form those of Example 6.

As an alignment substrate, a polyethylenenaphthalate film receiving a rubbing treatment was used. This was obtained by rubbing a Teonecs film 75 μm thick made by Teijin Ltd. with a cloth piece in one direction. The liquid crystal material solution obtained was applied on the rubbing polyethylenenaphtalate film as an alignment substrate by a spin coat method to form a coat. Then the coat was dried, subjected to a heat treatment at 130° C. to align the liquid crystal material, thereafter the coat was exposed to light irradiation from a high pressure mercury lamp to perfectly fix an orientational order of a discotic liquid crystal. The light irradiation was carried out in the air atmosphere at 80° C. and the exposure dose was selected at 600 mJ/cm². Optical properties of thus obtained film 5 are shown in Table 2. The A interface side in FIG. 1 of the film 5 was present at an interface of the side abutting on the polyethylenenaphthalate film. A direction of an alignment control force on the interface almost coincided with the rubbing direction of the polyethylenenaphthalate, but an angular displacement of 5 degrees was observed therebetween.

Since the polyethylenenaphthalate film lacks transparency and thereby the film cannot be used as a member of a liquid crystal device, removal of the film was carried out by a process described below.

The film 5 on the polyethylenenaphthalate film was first transferred on a polypropylene film with an ultraviolet curing type adhesive interposing therebetween. Operations comprised the steps of: applying the ultraviolet curing type adhesive on the film 5 by a roll coat method; then laminating the polypropylene film on the adhesive; irradiating an ultraviolet light from a high pressure mercury lamp on the film to cure the adhesive; and separating the polyethylenenaphthalate film off from the film 5.

The film 5 was stuck on a polarizing plate with an adhesive interposing therebetween by a surface of the film 5 which had been separated from the polyethylenenaphthalene film. A fast axis vector of the film 5 and a transmission axis of the polarizing plate were arranged in a spatial configuration shown in FIG. 18. Then the polypropylene film was separated off to obtain a device comprising the polarizing plate and the film 5 as one body bonded to each other in an overall constitution of the polarizing plate/adhesive/film 5/ultraviolet curing type adhesive layer. The A interface in FIG. 1(a) of the film 5 was at an interface of the side abutting on the adhesive layer of the polarizing plate by receiving the above mentioned process. Such two elements each comprising the film 5 and a polarizing plate were used to measure dependence of a contrast ratio on a viewing angle, wherein the elements were placed on a liquid crystal cell of a TN type for drive in the arrangement of FIG. 18. The liquid crystal cell used in Example 6 was again used in this example and driven in the same condition as Example 6. As a result, a display with a wide viewing angle as shown in FIG. 19 was obtained.

TABLE 2

| film | absolute film thickness | Δn (@550 nm) | film thickness xΔn | apparent retardation in plane | extinction axis angle | optical rotating angle |
|---|---|---|---|---|---|---|
| 1 | 1.8 μm | 0.12 | 220 nm | 40 nm | −42° | +1.0° |
| 1' | 2.0 μm | 0.12 | 240 nm | 45 nm | 0 | 0 |
| 2 | 2.8 μm | 0.10 | 280 nm | 30 nm | −43° | +3.0° |
| 3 | 2.0 μm | 0.10 | 200 nm | 18 nm | −35° | +1.5° |
| 4 | 2.0 μm | 0.09 | 180 nm | 25 nm | −25° | +2.0° |
| 5 | 2.6 μm | 0.09 | 230 nm | 32 nm | −27° | +2.5° |

A liquid crystal display of the present invention has an optimized arrangement of a specific compensating film and a liquid crystal cell of a TN type for drive and thereby the device has a very wide viewing angle which has never conventionally been realized, which enables the device to be applied to a liquid crystal monitor and a liquid crystal television receiver, so that an extremely high evaluation is given to the device in an industrial aspect.

What is claimed is:

1. A liquid crystal display device comprising:
a liquid crystal cell of a TN type for drive; a pair of polarizing plates sandwiching the liquid crystal cell; at least one compensating film which has a quasi extinction axis angle of 5 to 90 degrees as an absolute value and an optical rotating angle of 0.5 to 10 degrees as an absolute value, wherein signs of the extinction axis angle and the optical rotating angle are contrary to each other, is inserted between the liquid crystal cell and an upper polarizing plate, or between the liquid crystal cell and the lower polarizing plate, or at least two compensating films are respectively inserted between the liquid crystal cell and the upper polarizing plate, and between the liquid crystal cell and the lower polarizing plate, wherein an arrangement condition is such that a quasi fast axis vector of a compensating film and an easy axis vector of an electrode substrate nearer the compensating film of the liquid crystal satisfy an angular relation therebetween in the range of −30 to +30 degrees or +150 to +210 degrees.

2. A liquid crystal display device according to claim 1, wherein two compensating films are respectively inserted between the liquid crystal cell for drive and the upper polarizing plate, and between the liquid crystal cell and the lower polarizing plate to form a structure of the upper polarizing plate/upper compensating film/liquid crystal cell for drive/lower compensating film/lower polarizing plate, wherein an angle between a quasi fast axis vector of the upper compensating film and an easy axis vector of an upper electrode substrate of the liquid crystal cell and an angle between a quasi fast axis vector of the lower compensating film and an easy axis vector of a lower electrode substrate of the liquid crystal cell are equal to each other.

3. A liquid crystal display device according to claim 1, wherein the at least one compensating film comprises a discotic liquid crystal having a twisted orientational order such that a magnitude of a projected vector on a film plane of a director of the discotic liquid crystal changes along a thickness direction of the film.

* * * * *